(12) United States Patent
Ovsiannikov

(10) Patent No.: US 10,531,073 B2
(45) Date of Patent: Jan. 7, 2020

(54) METHOD AND APPARATUS FOR AUTOMATIC CALIBRATION OF RGBZ SENSORS UTILIZING EPIPOLAR GEOMETRY AND SCANNING BEAM PROJECTOR

(71) Applicant: Samsung Electronics Co., Ltd., Suwon-si, Gyeonggi-do (KR)

(72) Inventor: Ilia Ovsiannikov, Studio City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 628 days.

(21) Appl. No.: 15/157,389

(22) Filed: May 17, 2016

(65) Prior Publication Data

US 2017/0272726 A1 Sep. 21, 2017

Related U.S. Application Data

(60) Provisional application No. 62/309,951, filed on Mar. 17, 2016.

(51) Int. Cl.
| | |
|---|---|
| *H04N 13/246* | (2018.01) |
| *H04N 13/257* | (2018.01) |
| *G01C 3/08* | (2006.01) |
| *G01C 25/00* | (2006.01) |
| *G01C 11/30* | (2006.01) |

(Continued)

(52) U.S. Cl.
CPC ............ *H04N 13/246* (2018.05); *G01C 3/08* (2013.01); *G01C 11/30* (2013.01); *G01C 25/00* (2013.01); *H04N 13/254* (2018.05); *H04N 13/257* (2018.05); *H04N 13/271* (2018.05)

(58) Field of Classification Search
None
See application file for complete search history.

(56) References Cited

U.S. PATENT DOCUMENTS

| | | | |
|---|---|---|---|
| 5,283,640 A * | 2/1994 | Tilton | .................. H04N 13/254 348/42 |
| 7,724,379 B2 | 5/2010 | Kawasaki et al. | |

(Continued)

*Primary Examiner* — William C Vaughn, Jr.
*Assistant Examiner* — Stuart D Bennett
(74) *Attorney, Agent, or Firm* — Renaissance IP Law Group LLP

(57) ABSTRACT

Using one or more patterned markers inside the projector module of a three-dimensional (3D) camera to facilitate automatic calibration of the camera's depth sensing operation. The 3D camera utilizes epipolar geometry-based imaging in conjunction with laser beam point-scans in a triangulation-based approach to depth measurements. A light-sensing element and one or more reflective markers inside the projector module facilitate periodic self-calibration of camera's depth sensing operation. To calibrate the camera, the markers are point-scanned using the laser beam and the reflected light is sensed using the light-sensing element. Based on the output of the light-sensing element, the laser's turn-on delay is adjusted to perfectly align a laser light spot with the corresponding reflective marker. Using reflective markers, the exact direction and speed of the scanning beam over time can be determined as well. The marker-based automatic calibration can periodically run in the background without interfering with the normal camera operation.

15 Claims, 9 Drawing Sheets

(51) Int. Cl.
*H04N 13/254* (2018.01)
*H04N 13/271* (2018.01)

(56) References Cited

U.S. PATENT DOCUMENTS

| | | |
|---|---|---|
| 8,836,766 B1 | 9/2014 | Hebert et al. |
| 2005/0030606 A1* | 2/2005 | Nakajima .......... G02B 26/0841 359/213.1 |
| 2006/0192094 A1* | 8/2006 | Taniguchi ................ G02B 5/00 250/235 |
| 2011/0018973 A1 | 1/2011 | Takayama |
| 2015/0172635 A1 | 6/2015 | Kimmel et al. |

* cited by examiner

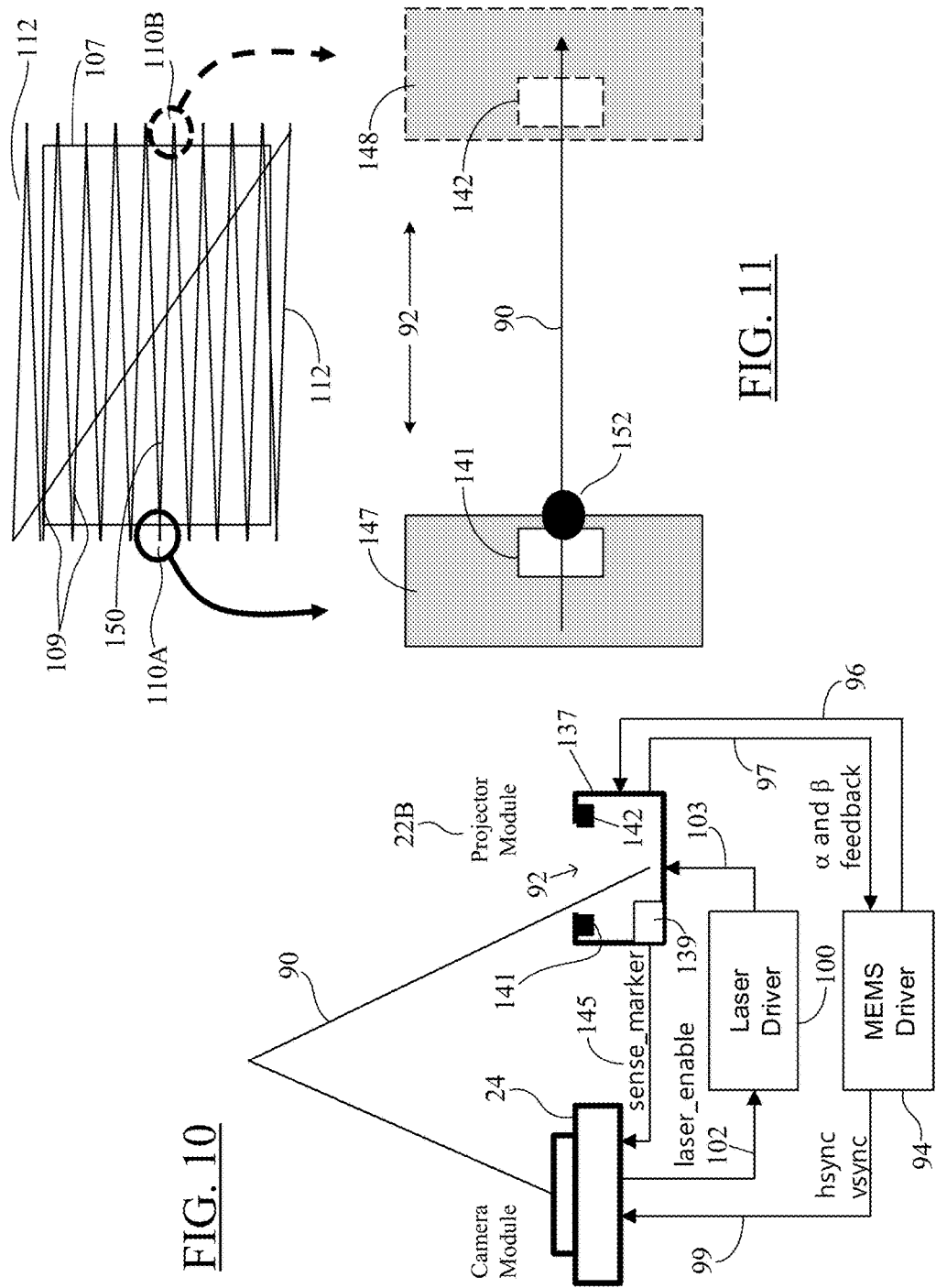

METHOD AND APPARATUS FOR AUTOMATIC CALIBRATION OF RGBZ SENSORS UTILIZING EPIPOLAR GEOMETRY AND SCANNING BEAM PROJECTOR

TECHNICAL FIELD

The present disclosure generally relates to image sensors. More specifically, and not by way of limitation, particular embodiments of the inventive aspects disclosed in the present disclosure are directed to co-ordinated sensing of internal patterned markings to facilitate automatic calibration of a three-dimensional (3D) imaging system or depth sensor that utilizes epipolar geometry-based imaging in conjunction with a scanning beam projector in a triangulation-based approach to depth measurements on a 3D object.

BACKGROUND

Three-dimensional (3D) imaging systems are increasingly being used in a wide variety of applications such as, for example, industrial production, video games, computer graphics, robotic surgeries, consumer displays, surveillance videos, 3D modeling, real estate sales, and so on.

Existing 3D imaging technologies may include, for example, the time-of-flight (TOF) based range imaging, stereo vision systems, and structured light (SL) methods.

In the TOF method, distance to a 3D object is resolved based on the known speed of light—by measuring the round-trip time it takes for a light signal to travel between a camera and the 3D object for each point of the image. A TOF camera may use a scanner-less approach to capture the entire scene with each laser or light pulse. Some example applications of the TOF method may include advanced automotive applications such as active pedestrian safety or pre-crash detection based on distance images in real time, to track movements of humans such as during interaction with games on video game consoles, in industrial machine vision to classify objects and help robots find the items such as items on a conveyor belt, and so on.

In stereoscopic imaging or stereo vision systems, two cameras—displaced horizontally from one another—are used to obtain two differing views on a scene or a 3D object in the scene. By comparing these two images, the relative depth information can be obtained for the 3D object. Stereo vision is highly important in fields such as robotics, to extract information about the relative position of 3D objects in the vicinity of autonomous systems/robots. Other applications for robotics include object recognition, where stereoscopic depth information allows a robotic system to separate occluding image components, which the robot may otherwise not be able to distinguish as two separate objects—such as one object in front of another, partially or fully hiding the other object. 3D stereo displays are also used in entertainment and automated systems.

In the SL approach, the 3D shape of an object may be measured using projected light patterns and a camera for imaging. In the SL method, a known pattern of light—often grids or horizontal bars or patterns of parallel stripes—is projected onto a scene or a 3D object in the scene. The projected pattern may get deformed or displaced when striking the surface of the 3D objet. Such deformation may allow an SL vision system to calculate the depth and surface information of the object. Thus, projecting a narrow band of light onto a 3D surface may produce a line of illumination that may appear distorted from other perspectives than that of the projector, and can be used for geometric reconstruction of the illuminated surface shape. The SL-based 3D imaging maybe used in different applications such as, for example, by a police force to photograph fingerprints in a 3D scene, inline inspection of components during a production process, in health care for live measurements of human body shapes or the micro structures of human skin, and the like.

SUMMARY

In one embodiment, the present disclosure is directed to an imaging unit that comprises a projector module having an enclosure, which includes: (i) a light source operable to perform a one-dimensional (1D) point scan of a three-dimensional (3D) object along a plurality of scanning lines, wherein the point scan projects a sequence of light spots on a surface of the 3D object through an opening in the enclosure, wherein the opening defines boundaries of a field of scan on the surface of the 3D object in which the light spots are projected along the plurality of scanning lines, and wherein the opening is such that each of the plurality of scanning lines extends inside the enclosure beyond the field of scan; (ii) at least one first reflective marker on a first side of the opening inside the enclosure, wherein each first reflective marker is present along at least one scanning line and outside of the field of scan; and (iii) a photo sensor operable to sense light reflected from each first reflective marker that is illuminated by the light source when the light source is activated to project light spots beyond the field of scan.

In another embodiment, the present disclosure is directed to a method that comprises: (i) performing a 1D point scan of a 3D object along a scanning line, wherein the point scan projects a sequence of light spots on a surface of the 3D object through an opening in an enclosure, wherein the opening defines boundaries of a field of scan on the surface of the 3D object in which the light spots are projected along the scanning line, and wherein the opening is such that the scanning line extends inside the enclosure beyond the field of scan; (ii) projecting one or more light spots on a reflective marker that is present adjacent to the opening inside the enclosure along the scanning line and outside of the field of scan; (iii) sensing light reflected from the reflective marker; and (iv) based on the sensed light, adjusting placement of the one or more light spots to be projected on the reflective marker in a future point scan.

In a further embodiment, the present disclosure is directed to a system, which comprises: (i) a projector module having an enclosure; (ii) a memory for storing program instructions; and (iii) a processor coupled to the memory and to the projector module. In the system, the enclosure of the projector module includes: (i) a light source operable to perform a 1D point scan of a 3D object along a plurality of scanning lines, wherein the point scan projects a sequence of light spots on a surface of the 3D object through an opening in the enclosure, wherein the opening defines boundaries of a field of scan on the surface of the 3D object in which the light spots are projected along the plurality of scanning lines, and wherein the opening is such that each of the plurality of scanning lines extends inside the enclosure beyond the field of scan; (ii) a reflective marking adjacent to the opening inside the enclosure, wherein the reflective marking is present along at least one scanning line and outside of the field of scan; and (iii) a photo sensor operable to generate an output signal upon sensing light reflected from the reflective marking that is illuminated by the light source when the light source is activated to project light spots beyond the field of scan. The processor is configured to execute the program instructions (stored in the memory), whereby the processor is operative to perform the following: (i) send an enable signal to the projector module to activate the light source to project one or more light spots on the reflective marking; (ii) receive the output signal from the photo sensor; (iii) perform an analysis of the output signal; and (iv) based on the analysis, adjust placement of the one or more light spots to be projected on the reflective marking in a future point scan.

BRIEF DESCRIPTION OF THE DRAWINGS

In the following section, the inventive aspects of the present disclosure will be described with reference to exemplary embodiments illustrated in the figures, in which:

FIG. 10 provides additional architectural details of the exemplary projector module shown in the embodiment of FIG. 9;

FIG. 11 illustrates an exemplary magnified diagram of how laser spots may be sensed using one or more reflective markers for automatic calibration of the system in FIG. 1 according to one embodiment of the present disclosure;

DETAILED DESCRIPTION

Figure 1:
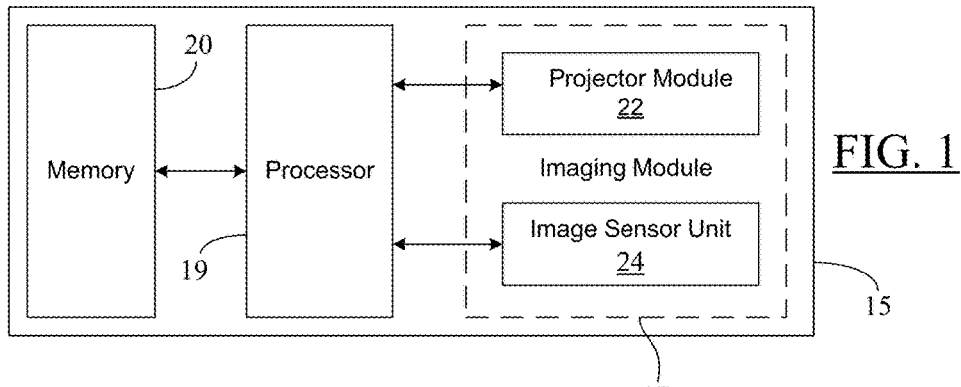
FIG. 1 shows a highly simplified, partial layout of a system according to one embodiment of the present disclosure.

In the following detailed description, numerous specific details are set forth in order to provide a thorough understanding of the disclosure. However, it will be understood by those skilled in the art that the disclosed inventive aspects may be practiced without these specific details. In other instances, well-known methods, procedures, components and circuits have not been described in detail so as not to obscure the present disclosure. Additionally, the described inventive aspects can be implemented to perform low power, 3D depth measurements in any imaging device or system, including, for example, a smartphone, a User Equipment (UE), a laptop computer, and the like.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "two-dimensional," "pre-determined", "horizontally-aligned," etc.) may be occasionally interchangeably used with its non-hyphenated version (e.g., "two dimensional," "predetermined", "horizontally aligned," etc.), and a capitalized entry (e.g., "Projector Module," "XY-addressable," etc.) may be interchangeably used with its non-capitalized version (e.g., "projector module," "xy-addressable," etc.). Such occasional interchangeable uses shall not be considered inconsistent with each other.

It is noted at the outset that the terms "coupled," "operatively coupled," "connected", "connecting," "electrically connected," etc., may be used interchangeably herein to generally refer to the condition of being electrically/electronically connected in an operative manner. Similarly, a first entity is considered to be in "communication" with a second entity (or entities) when the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale. Similarly, various waveforms and timing diagrams are shown for illustrative purpose only.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, signals, or modules having the same or similar functionality. However, such usage is for simplicity of illustration and ease of discussion only; it does not imply that the construction or architectural details of such components or units are the same across all embodiments or such commonly-referenced parts/modules are the only way to implement the teachings of particular embodiments of the present disclosure.

It is observed here that the earlier-mentioned 3D technologies have a number of drawbacks. For example, a TOF—based 3D imaging system may require high power to operate optical or electrical shutters. Hence, a TOF system may not be desirable for cell phone-based camera applications, where low power consumption is a critical requirement. A TOF sensor may also require special pixels with big pixel sizes, usually larger than 7 µm, which may cause a reduced sensor resolution. These pixels also may be vulnerable to ambient light.

The stereoscopic imaging approach generally works only with textured surfaces and in good illumination conditions. Furthermore, stereo imaging requires two regular, high bit-resolution sensors along with two lenses, making the entire assembly unsuitable for applications in portable devices, like cell phones or tablets, where device real estate is at a premium.

Legacy SL approaches can be vulnerable to elevated levels of ambient light, especially in outdoor conditions. Thus, a structured light-based system may not be suitable for consumer image sensors in smartphones.

SL and TOF 3D technologies can be enhanced to simultaneously capture a color image in addition to the 3D image, for example, by adding a separate color sensor into the camera capable of capturing both color and 3D image using a single sensor.

In contrast to the above-mentioned 3D technologies, particular embodiments of the present disclosure provide for implementing a low power, 3D imaging system capable of working in a wide range of conditions, including both strong ambient light and poor illumination, on portable, compact electronic devices such as smartphones, tablets, UEs, and the like, while capturing both depth and color image using only one image sensor. A 2D imaging sensor as per particular embodiments of the present disclosure can capture both 2D RGB (Red, Green, Blue) color images and 3D depth measurements with visible light laser scanning. It is noted here that although the following discussion may frequently mention the visible light laser as a light source for point-scans and a 2D RGB sensor as an image/light capture device, such mention is for the purpose of illustration and consistency of discussion only. The visible laser and RGB sensor based examples discussed below may find applications in low-power, consumer-grade mobile electronic devices with cameras such as, for example, smartphones, tablets, or UEs. However, it is understood that the teachings of the present disclosure are not limited to the visible laser-RGB sensor based examples mentioned below. Rather, according to particular embodiments of the present disclosure, the point scan-based 3D depth measurements may be performed using many different combinations of 2D sensors and laser light sources (for point scans) such as, for example: (i) a 2D color (RGB) sensor with a visible light laser source, in which the laser source may be a red (R), green (G), or blue (B) light laser, or a laser source producing a combination of these lights; (ii) a visible light laser with a 2D RGB color sensor having an Infrared (IR) cut filter; (iii) a Near Infrared (NIR) laser with a 2D NIR sensor; (iv) an NIR laser with a 2D RGB sensor (without an IR cut filter); (v) a 2D RGBW (red, green, blue, white) sensor with either visible or NIR laser; and so on.

During 3D depth measurements, the entire sensor may operate as a timestamping sensor in conjunction with the laser scan to reconstruct 3D content. In particular embodiments, the pixel size of the sensor can be as small as 1 µm.

Furthermore, due to lower bit-resolution, the image sensor according to particular embodiments of the present disclosure may require significantly much lower processing power than that is needed for high bit-resolution sensors in traditional 3D imaging systems. Because of the need for less processing power and small component dimensions, the 3D imaging module according to present disclosure may require low system power and, hence, may be quite suitable for inclusion in low power devices like smartphones.

In particular embodiments, the present disclosure uses SL-like triangulation and point scans with a laser light source for 3D depth measurements with a sensor's pixel rows functioning as a collection of line sensors. The laser scanning plane and the imaging plane are oriented using epipolar geometry, such that each horizontal laser scan is imaged by a certain sensor row. An image sensor according to one embodiment of the present disclosure may use timestamps to remove ambiguity in the triangulation approach, thereby reducing the amount of depth computations and system power. The same image sensor—that is, each pixel in the image sensor—may be used in the normal 2D (RGB color or non-RGB) imaging mode as well as in the 3D laser scan mode to substantially concurrently capture both color and depth images. Furthermore, the point scan approach utilizes very short laser exposure time, thus effectively eliminating motion-induced blur and counteracting strong ambient illumination while keeping the total exposure low and eye-safe, and may allow the system to take depth measurements effectively interleaved with the color capture, thereby reducing the latency for depth measurements versus the color capture.

As noted before, in particular embodiments, the entire image sensor may be used for routine 2D RGB color imaging using, for example, ambient light, as well as for 3D depth imaging using visible laser scan. Such dual use of the same camera unit may save space and cost for mobile devices. Furthermore, in certain applications, the use of a visible laser for 3D applications may be better for a user's eye safety as compared to a Near Infrared (NIR) laser. The sensor may have higher quantum efficiency at visible spectrum than at the NIR spectrum, leading to lower power consumption of the light source.

FIG. 1 shows a highly simplified, partial layout of a system 15 according to one embodiment of the present disclosure. As shown, the system 15 may include an imaging module 17 coupled to and in communication with a processor or host 19. The system 15 may also include a memory module 20 coupled to the processor 19 to store information content such as, for example, image data received from the imaging module 17. In particular embodiments, parts of the entire system 15 may be encapsulated in a single Integrated Circuit (IC) or chip. Alternatively, each of the modules 17, 19, and 20 may be implemented in a separate chip. Furthermore, the memory module 20 may include more than one memory chip, and the processor module 19 may comprise of multiple processing chips as well. In any event, the details about packaging of the modules in FIG. 1 and how they are fabricated or implemented—in a single chip or using multiple discrete chips—are not relevant to the present discussion and, hence, such details are not provided herein.

The system 15 may be any low power, electronic device configured for 2D and 3D camera applications as per teachings of the present disclosure. The system 15 may be portable or non-portable. Some examples of the portable version of the system 15 may include popular consumer electronic gadgets such as, for example, a mobile device, a cellphone, a smartphone, a User Equipment (UE), a tablet, a digital camera, a laptop or desktop computer, an electronic smartwatch, a Machine-to-Machine (M2M) communication unit, a Virtual Reality (VR) equipment or module, a robot, and the like. On the other hand, some examples of the non-portable version of the system 15 may include a game console in a video arcade, an interactive video terminal, an automobile, a machine vision system, an industrial robot, a VR equipment, a driver-side mounted camera in a car (for example, to monitor whether the driver is awake or not), and so on. The 3D imaging functionality provided as per teachings of the present disclosure may be used in many applications such as, for example, virtual reality applications on a virtual reality equipment, online chatting/gaming, 3D texting, searching an online or local (device-based) catalog/database using a product's 3D image to obtain information related to the product (for example, calorie content of a piece of food item), robotics and machine vision applications, automobile applications such as autonomous driving applications, and the like.

In particular embodiments of the present disclosure, the imaging module 17 may include a projector module 22 and an image sensor unit 24. As discussed in more detail with reference to FIG. 2 below, in one embodiment, the projector module 22 may include a light source such as, for example, a visible laser, and associated controller circuits. In other embodiments, the light source may be an NIR laser. The image sensor unit 24 may include a pixel array and ancillary processing circuits as shown in FIG. 2 and also discussed below.

In one embodiment, the processor 19 may be a CPU, which can be a general purpose microprocessor. In the discussion herein, the terms "processor" and "CPU" may be used interchangeably for ease of discussion. However, it is understood that, instead of or in addition to the CPU, the processor 19 may contain any other type of processors such as, for example, a microcontroller, a Digital Signal Processor (DSP), a Graphics Processing Unit (GPU), a dedicated Application Specific Integrated Circuit (ASIC) processor, and the like. Furthermore, in one embodiment, the processor/host 19 may include more than one CPU, which may be operative in a distributed processing environment. The processor 19 may be configured to execute instructions and to process data according to a particular Instruction Set Architecture (ISA) such as, for example, an x86 instruction set architecture (32-bit or 64-bit versions), a PowerPC® ISA, or a MIPS (Microprocessor without Interlocked Pipeline Stages) instruction set architecture relying on RISC (Reduced Instruction Set Computer) ISA. In one embodiment, the processor 19 may be a System on Chip (SoC) having functionalities in addition to a CPU functionality.

In particular embodiments, the memory module 20 may be a Dynamic Random Access Memory (DRAM) such as, for example, a Synchronous DRAM (SDRAM), or a DRAM-based Three Dimensional Stack (3DS) memory module such as, for example, a High Bandwidth Memory (HBM) module, or a Hybrid Memory Cube (HMC) memory module. In other embodiments, the memory module 20 may be a Solid State Drive (SSD), a non-3DS DRAM module, or any other semiconductor-based storage system such as, for example, a Static Random Access Memory (SRAM), a Phase-Change Random Access Memory (PRAM or PCRAM), a Resistive Random Access Memory (RRAM or ReRAM), a Conductive-Bridging RAM (CBRAM), a Magnetic RAM (MRAM), a Spin-Transfer Torque MRAM (STT-MRAM), and the like.

Figure 2:
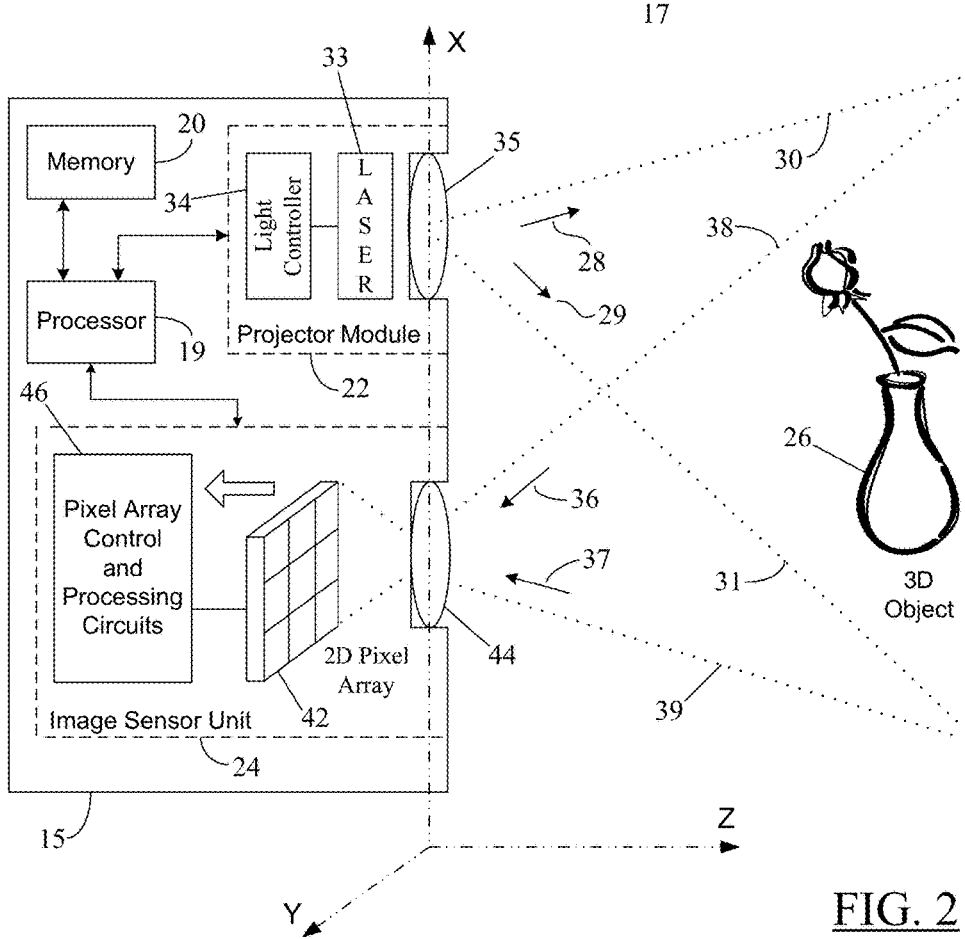
FIG. 2 illustrates an exemplary operational layout of the system in FIG. 1 according to one embodiment of the present disclosure.

FIG. 2 illustrates an exemplary operational layout of the system 15 in FIG. 1 according to one embodiment of the present disclosure. The system 15 may be used to obtain depth information (along the Z-axis) for a 3D object, such as the 3D object 26, which may be an individual object or an object within a scene (not shown). In one embodiment, the depth information may be calculated by the processor 19 based on the scan data received from the image sensor unit 24. In another embodiment, the depth information may be calculated by the image sensor unit 24 itself. In particular embodiments, the depth information may be used by the processor 19 as part of a 3D user interface to enable the user of the system 15 to interact with the 3D image of the object or use the 3D image of the object as part of games or other applications running on the system 15. The 3D imaging as per teachings of the present disclosure may be used for other purposes or applications as well, and may be applied to substantially any scene or 3D objects.

In FIG. 2, the X-axis is taken to be the horizontal direction along the front of the device 15, the Y-axis is the vertical direction (out of the page in this view), and the Z-axis extends away from the device 15 in the general direction of the object 26 being imaged. For the depth measurements, the optical axes of the modules 22 and 24 may be parallel to the Z-axis. Other optical arrangements may be used as well to implement the principles described herein, and these alternative arrangements are considered to be within the scope of the present disclosure.

The projector module 22 may illuminate the 3D object 26 as shown by exemplary arrows 28-29 associated with corresponding dotted lines 30-31 representing an illumination path of a light beam or optical radiation that may be used to point scan the 3D object 26 within an optical field of view. A raster scan-based optical field of view is illustrated in FIGS. 6 and 11, which are discussed later below. A line-by-line point scan of the object surface may be performed using an optical radiation source, which, in one embodiment, may be a laser light source 33 operated and controlled by a light controller module 34. The laser source 33 and components of the light controller 34 may be securely-mounted within an enclosure or housing (not shown) that is part of the projector module 22. For ease of illustration, such an enclosure is not shown in FIG. 2, but is shown and discussed later with reference to other figures such as, for example, FIGS. 5A-5B and FIGS. 9-10. In particular embodiments, the entire projector module 22 may be placed within an enclosure, in which case the reference numeral "22" may be used to interchangeably refer to a projector module or an enclosure.

A light beam from the laser source 33 may be point scanned—under the control of the light controller 34—in the X-Y direction across the surface of the 3D object 26 via projection optics 35. The point scan may project light spots on the surface of the 3D object along a scan line, as discussed in more detail with reference to FIGS. 3-4 below. The projection optics may be a focusing lens, a glass/plastics surface, or other cylindrical optical element that concentrates laser beam from the laser 33 as a point or spot on the surface of the object 26. In the embodiment of FIG. 2, a convex structure is shown as a focusing lens 35. However, any other suitable lens design may be selected for projection optics 35. The object 26 may be placed at a focusing location where illuminating light from the light source 33 is focused by the projection optics 35 as a light spot. Thus, in the point scan, a point or narrow area/spot on the surface of the 3D object 26 may be illuminated sequentially by the focused light beam from the projection optics 35.

In particular embodiments, the light source (or illumination source) 33 may be a diode laser or a Light Emitting Diode (LED) emitting visible light, an NIR laser, a point light source, a monochromatic illumination source (such as, for example, a combination of a white lamp and a monochromator) in the visible light spectrum, or any other type of laser light source. In particular embodiments, the laser 33 may be fixed in one position within the housing of the projector module 22 (or the housing of the device 15 itself). In certain embodiments, the laser 33 may be rotatable in the X-Y directions. In other embodiments, the laser 33 may not be rotatable, in which case the laser light may be scanned in the x-y directions using a resonating Micro Electro-Mechanical Systems (MEMS) scanner (as discussed later with reference to FIGS. 5-6). In any event, the laser light may be made X-Y addressable (for example, by the light controller 34) to perform the point scan of the 3D object 26. In one embodiment, the visible light may be substantially green light. The visible light illumination from the laser source 33 may be projected onto the surface of the 3D object 26 using a mirror (not shown), or the point scan may be completely mirror-less. In particular embodiments, the projector module 22 may include more or less components than those shown in the exemplary embodiment of FIG. 2.

In the embodiment of FIG. 2, the light reflected from the point scan of the object 26 may travel along a collection path indicated by arrows 36-37 and dotted lines 38-39. The light collection path may carry photons reflected from or scattered by the surface of the object 26 upon receiving illumination from the laser source 33. It is noted here that the depiction of various propagation paths using solid arrows and dotted lines in FIG. 2 (and also in FIGS. 3-4, as applicable) is for illustrative purpose only. The depiction should not be construed to illustrate any actual optical signal propagation paths. In practice, the illumination and collection signal paths may be different from those shown in FIG. 2, and may not be as clearly-defined as in the illustration in FIG. 2.

The light received from the illuminated object 26 may be focused onto one or more pixels of a 2D pixel array 42 via collection optics 44 in the image sensor unit 24. Like the projection optics 35, the collection optics 44 may be a focusing lens, a glass/plastics surface, or other optical element that concentrates the reflected light received from the object 26 onto one or more pixels in the 2D array 42. In the embodiment of FIG. 2, a convex structure is shown as a focusing lens 44. However, any other suitable lens design may be selected for collection optics 44. Furthermore, for ease of illustration, only a 3×3 pixel array is shown in FIG. 2. However, it is understood that, modern pixel arrays contain millions or tens of millions of pixels. The pixel array 42 may be an RGB pixel array, in which different pixels may collect light signals of different colors. As mentioned before, in particular embodiments, the pixel array 42 may be any 2D sensor such as, for example, a 2D RGB sensor with IR cut filter, a 2D NIR sensor, a 2D RGBW sensor, a 2D RWB (Red, White, Blue) sensor, a multi-layer Complementary Metal-Oxide Semiconductor (CMOS) organic sensor, a 2D RGB-IR sensor, and the like. The system 15 may use the same pixel array 42 for 2D color imaging of the object 26 (or a scene containing the object) as well as for 3D imaging (involving depth measurements) of the object 26.

The pixel array 42 may convert the received photons into corresponding electrical signals, which are then processed by the associated image processing unit 46 to determine the 3D depth image of the object 26. In one embodiment, the image processing unit 46 may use triangulation for depth measurements. The triangulation approach is discussed later with reference to FIG. 3. The image processing unit 46 may also include relevant circuits for controlling the operation of the pixel array 42.

The processor 19 may control the operations of the projector module 22 and the image sensor unit 24. For example, the system 15 may have a mode switch (not shown) controllable by the user to switch from 2D-only imaging mode to 2D-and-3D imaging mode. When the user selects the 2D imaging mode using the mode switch, the processor 19 may activate the image sensor unit 24, but may not activate the projector module 22 because 2D imaging may use ambient light. On the other hand, when the user selects 2D-and-3D imaging using the mode switch, the processor 19 may activate both of the modules 22, 24. The processed image data received from the image processing unit 46 may be stored by the processor 19 in the memory 20. The processor 19 may also display the user-selected 2D or 3D image on a display screen (not shown) of the device 15. The processor 19 may be programmed in software or firmware to carry out various processing tasks described herein. Alternatively or additionally, the processor 19 may comprise programmable hardware logic circuits for carrying out some or all of its functions. In particular embodiments, the memory 20 may store program code, look-up tables, and/or interim computational results to enable the processor 19 to carry out its functions.

Figure 4:
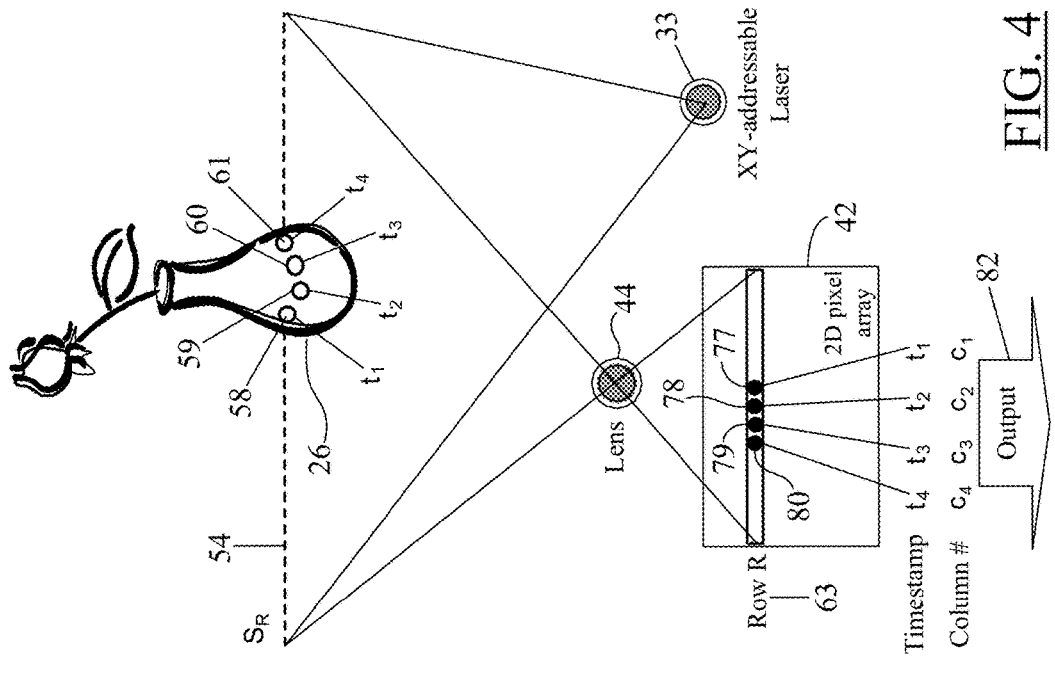
FIG. 4 illustrates an exemplary time-stamping for scanned light spots according to one embodiment of the present disclosure.
Figure 3:
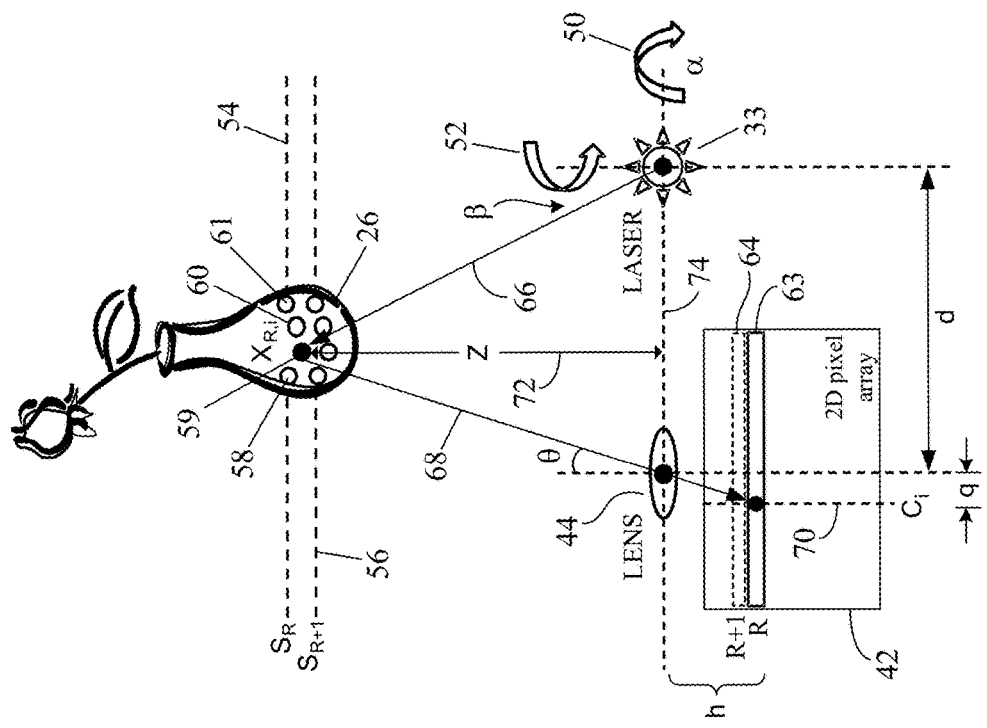
FIG. 3 is an exemplary illustration of how a point scan may be performed for 3D depth measurements according to one embodiment of the present disclosure.

It is noted that the discussion of FIGS. 3-4 provides a brief overview of a point-scan based depth measurement approach using timestamping. On the other hand, FIGS. 5-7 are used to explain horizontal and vertical calibration errors that may arise in a point-scan based depth measurement system. Finally, the discussion of FIGS. 8-13 relate to how automatic calibration according to the teachings of the present disclosure may be implemented in particular embodiments to ameliorate or rectify various calibration errors in a depth sensor that utilizes epipolar geometry and a scanning beam projector.

FIG. 3 is an exemplary illustration of how a point scan may be performed for 3D depth measurements according to one embodiment of the present disclosure. Before describing FIG. 3 in detail, a brief overview of the point scan-based 3D depth measurement is provided below. In the discussion herein, by way of an example only, specific tasks are described as being performed by specific modules or system components. However, if needed, certain other modules or system components may be suitably configured to perform such tasks as well.

Generally, the system 15 (more specifically, the processor 19) may perform a one-dimensional (1D) point scan of a 3D object, such as the object 26 in FIG. 2, along a scanning line using a light source, such as the projector module 22 in FIG. 2. As part of the point scan, the projector module 22 may be configured, for example, by the processor 19, to project a sequence of light spots on a surface of the 3D object 26 in a line-by-line manner. The pixel processing unit 46 in the system 15 may select a row of pixels in an image sensor, such as the 2D pixel array 42 in FIG. 2. The image sensor 42 has a plurality of pixels arranged in a 2D array forming an image plane, and, in one embodiment, the selected row of pixels forms an epipolar line of the scanning line on the image plane. A brief discussion of epipolar geometry is provided below. The pixel processing unit 46 may be operatively configured by the processor 19 to detect each light spot using a corresponding pixel in the selected row of pixels. It is observed here that light reflected from an illuminated light spot (on the surface of the object 26) may be detected by a single pixel or more than one pixel such as, for example, when the light reflected from the illuminated spot gets focused by the collection optics 44 onto two or more adjacent pixels. On the other hand, it may be possible that light reflected from two or more light spots may be collected at a single pixel in the 2D array 42. The timestamp-based approach discussed below resolves the so-called correspondence problem by tracking which laser light spot was imaged by which pixel. The image processing unit 46—as suitably configured by the processor 19—may generate a pixel-specific output in response to a pixel-specific detection of a corresponding light spot in the sequence of light spots (in the point scan). Consequently, the image processing unit 46 may determine the 3D distance (or depth) to the corresponding light spot on the surface of the 3D object based at least on the pixel-specific output and on a scan angle used by the projector module 22 for projecting the corresponding light spot. This point scan-based depth measurement is now discussed in more detail below.

In FIG. 3, the X-Y rotational aspect of the laser light is illustrated using the arrows 50, 52 depicting the laser illumination's angular motions in the X-direction (having "yaw" angle "β") and in the Y-direction (having "pitch" or "elevation" angle "α"). As noted earlier, a resonant scanning MEMS mirror can enable the rotation to the illumination received from a stationary laser. One such mechanism is discussed later with reference to FIGS. 5A-5B. For ease of discussion and illustration, the laser source 33 is shown in FIGS. 3-4 as representative of the "XY-addressable" feature of the laser light. In one embodiment, the light controller 34 may control the X-Y rotation of the laser light based on scanning instructions/input received from the processor 19. For example, when the user selects the 2D-3D imaging mode, the processor 19 may instruct the light controller 34 to initiate 3D depth measurements of the object surface facing the projection optics 35. In response, the light controller 34 may initiate a series of 1D point scans of the object surface through X-Y movement of the laser light. As shown in FIG. 3, the surface of the object 26 may be point-scanned by projecting light spots along 1D horizontal scanning lines—two of which $S_R$ 54 and $S_{R+1}$ 56 are identified by dotted lines in FIG. 3. Because of the curvature of the surface of the object 26, the light spots 58-61 may form the scanning line $S_R$ 54 in FIG. 3. For ease of illustration and clarity, the light spots constituting the scan line $S_{R+1}$ 56 are not identified using reference numerals. The light from the laser 33 may scan the object 26 along rows R, R+1, and so on, one spot at a time—for example, in the left-to-right direction. The values of "R", "R+1", and so on, are with reference to rows of pixels in the 2D pixel array 42 and, hence, these values are known. For example, in the 2D pixel array 42 in FIG. 3, the pixel row "R" is identified using reference numeral "63" and the row "R+1" is identified using reference numeral "64." It is understood that rows "R" and "R+1" are selected from the plurality of rows of pixels for illustrative purpose only.

The plane containing the rows of pixels in the 2D pixel array 42 may be called the image plane, whereas a plane containing a scanning line and a corresponding row of pixels imaging that scanning line, like the line $S_R$ and row R or line $S_{R+1}$ and row R+1, may be called a scanning plane. In the embodiment of FIG. 3, the image plane and each scanning plane are oriented using epipolar geometry such that each row of pixels R, R+1, and so on, in the 2D pixel array 42 forms an epipolar line of the corresponding scanning line $S_R$, $S_{R+1}$, and so on. A row of pixels "R" may be considered epipolar to a corresponding scanning line "$S_R$" when a projection of an illuminated spot (in the scanning line) onto the image plane may form a distinct spot along a line that is the row "R" itself. For example, in FIG. 3, the arrow 66 illustrates the illumination of the light spot 59 along scan line $S_R$ by the laser 33, whereas the arrow 68 shows that the light spot 59 is being imaged or projected along the row "R" 63 by the focusing lens 44. Although not shown in FIG. 3, it is observed that all of the light spots 58-61 from scan line $S_R$ will be imaged by corresponding pixels in the row "R." Thus, in one embodiment, the physical arrangement, such as the position and orientation, of the laser 33 (or the projection of laser light, if the laser is not rotatable) and the pixel array 42 may be such that illuminated light spots in a scanning line on the surface of the object 26 may be captured or detected by pixels in a corresponding row in the pixel array 42—that row of pixels thus forming an epipolar line of the corresponding scanning line. Although not shown in FIG. 3, it is observed here that, in particular embodiments, a scanning line—such as the scanning line $S_R$—may not be perfectly straight, but may be curved or slanted. In case of a slightly curved/slanted scanning line, two or more substantially adjacent rows of pixels (in the pixel array 42) may collectively capture an epipolar line of the curved scanning line. In any event, the teachings of the present disclosure remain applicable regardless of whether a single row or a substantially small group of substantially adjacent rows of pixels in the image plane forms an epipolar line of a corresponding scanning line. However, for ease of explanation and without the loss of generality, the discussion of FIGS. 3-4 may primarily refer to the configuration in which a single row of pixels forms an entire epipolar line.

It is understood that the pixels in the 2D pixel array 42 may be arranged in rows and columns. An illuminated light spot may be referenced by its corresponding row and column in the pixel array 42. For example, in FIG. 3, the light spot 59 in the scanning line $S_R$ is designated as "$X_{R,i}$" to indicate that the spot 59 may be imaged by row "R" and column "i" ($C_i$) in the pixel array 42. The column $C_i$ is indicated by dotted line 70. Other illuminated spots may be similarly identified.

In the illustration of FIG. 3, the arrow having reference numeral "72" represents the depth or distance "Z" (along the Z-axis) of the light spot 59 from the X-axis along the front of the device 15—such as the X-axis shown in FIG. 2. In FIG. 3, a dotted line having the reference numeral "74" represents such axis, which may be visualized as being contained in a vertical plane that also contains the projection optics 35 and the collection optics 44. However, for ease of explanation of the triangulation method, the laser source 33 is shown in FIG. 3 as being on the X-axis 74 instead of the projection optics 35. In a triangulation-based approach, the value of "Z" may be determined using the following equation:

$$Z = \frac{hd}{q - h \tan \beta} \quad (1)$$

The parameters mentioned in the above equation (1) are also shown in FIG. 3. Based on the physical configuration of the device 15, the values for the parameters on the right-hand side of equation (1) may be pre-determined. In equation (1), parameter "h" is the "focal distance" (along the Z-axis) between the collection optics 44 and the row "R" in the image sensor (which is assumed to be in a vertical plane behind the collection optics 44); parameter "d" is the "base offset" distance between the light source 33 and the collection optics 44 associated with the image sensor 24; parameter "q" is the offset distance between the collection optics 44 and a pixel that detects the corresponding light spot— here, the detecting/imaging pixel "i" is represented by column $C_i$ associated with the light spot $X_{R,i}$ 59; and parameter "β" is the scan yaw angle or beam yaw angle of the light source in the scan plane for the light spot under consideration—here, the light spot 59. Alternatively, parameter "q" may also be considered as the offset of the light spot within the field of view of the pixel array 42. The angle "θ" in FIG. 3 is the incidence angle of reflected light (with respect to vertical direction) corresponding to the light spot 59.

It is seen from equation (1) that only parameters "β" and "q" are variable for a given point scan; the other parameters "h" and "d" are essentially fixed due to the physical geometry of the device 15. Because row "R" 63 is at least a portion of an epipolar line of the scanning line $S_R$, the depth difference or depth profile of the object 26 may be reflected by the image shift in the horizontal direction—as represented by the values of the parameter "q" for different lights spots being imaged. As discussed later below, the time-stamp based approach according to particular embodiments of the present disclosure may be used to find the correspondence between the pixel location of a captured light spot and the corresponding scan angle of the light from the laser source 33. In other words, a timestamp may represent an association between the values of parameters "q" and "β". Thus, from the known value of the laser angle "β" and the corresponding location of the imaged light spot (as represented by the parameter "q"), the distance to that light spot may be determined using the triangulation equation (1).

FIG. 4 illustrates an exemplary time-stamping for scanned light spots according to one embodiment of the present disclosure. In contrast to FIG. 3, in the embodiment of FIG. 4, the collection optics 44 and the laser 33 are shown in an offset arrangement to reflect the actual physical geometry of these components as shown in the embodiment of FIG. 2. By way of an example, the scanning line 54 is shown in FIG. 4 along with corresponding light spots 58-61, which, as mentioned before, may be projected based on a left-to-right point scan of the object surface by the sparse laser point source 33 or by a mechanism that projects the laser light as desired. Thus, as shown, the first light spot 58 may be projected at time instant "$t_1$," the second light spot 59 may be projected at time instant "$t_2$," and so on. These light spots may be detected/imaged by respective pixels 77-80 in pixel row "R" 63—which is an epipolar line of the scanning line $S_R$ as discussed earlier. In one embodiment, the charge collected by each pixel when detecting a light spot may be in the form of an analog voltage, which may be used to generate the corresponding timestamp to be output to the image processing unit 46 for pixel-specific depth determination as discussed below. The generated timestamps are collectively indicated by arrow 82 in FIG. 4.

As shown in FIG. 4, each detecting pixel 77-80 in row R may have an associated column number—here, columns $C_1$ through $C_4$. Furthermore, it is seen from FIG. 3 that each pixel column $C_i$ (i=1, 2, 3, and so on) has an associated value for the parameter "q" in equation (1). Thus, when a pixel-specific timestamp $t_1$-$t_4$ is generated for the detecting pixels 77-80, the timestamp may provide an indication of the pixel's column number and, hence, the pixel-specific value of the parameter "q." Additionally, in one embodiment, the spot-by-spot detection using pixels in the pixel array 42 may allow the image processing unit 46 to "link" each timestamp with the corresponding illuminated spot and, hence, with the spot-specific scan angle "β"—because the laser 33 may be suitably controlled to illuminate each spot in the desired sequence with pre-determined values for spot-specific scan angles "β". Thus, timestamps provide correspondence between the pixel location of a captured laser spot and its respective scan angle—in the form of the values for parameters "q" and "β" in equation (1) for each pixel-specific signal received from the pixel array 42. As discussed before, the values of the scan angle and the corresponding location of the detected spot in the pixel array 42—as reflected through the value of the parameter "q" in equation (1)—may allow depth determination for that light spot. In this manner, the 3D depth map for the surface of the object 26 in the field of view of the pixel array 42 may be generated.

Thus, the 3D object 26 may be point-scanned—one spot at a time—by the laser light source 33 along a row "R" 63 of the pixel array 42, where "R" is known based on its epipolar relation with the scanning line $S_R$ 54. After scanning one row, the scanning operation repeats with another row. In particular embodiments, such scanning may be in the form of a raster scan of the 3D object, as shown in the simplified illustration of FIG. 6 (discussed later). When the laser projects the next spot, the earlier-projected light spot may be imaged by the corresponding pixel in row R. The pixel-specific outputs from all the pixels in row R may be read out to the depth processing circuit/module. Each pixel-specific output may effectively represent a respective "timestamp" value providing a temporal indication of a pixel's detection of a light spot on the object surface illuminated by the laser light source 33. A "timestamp" may be considered to capture the light arrival time for a pixel. The timestamp values may establish a one-to-one temporal correspondence among each time-stamped light spot and pixel that imaged that light spot, thereby allowing the image processing unit 46 to determine distances to time-stamped light spots in the time-wise order specified by the temporal correspondence—the distance to the earliest illuminated light spot being determined first, and so on, until the distance to the last-illuminated light spot is determined. It is noted here that additional discussion of the above-described point scan-based depth measurements using timestamps may be obtained from the co-pending, commonly-assigned, U.S. Patent Applications to Wang et al, titled "CMOS Image Sensor for Depth Measurement using Triangulation with Point Scan," filed on Sep. 1, 2015, and having the Ser. No. 14/842,822, the relevant disclosure of which is incorporated herein by reference in its entirety.

As noted before, FIGS. 5-7 are used to explain horizontal and vertical calibration errors that may arise in a point-scan based depth measurement system. Prior to discussing FIGS. 5-7, it is observed here that the projector module 22 (more specifically, the laser light source 33) may be aligned with the image sensor unit 24 (more specifically, the 2D pixel array 42) at the time of manufacture or assembly of the depth sensor system 15 to satisfy the epipolar geometrical relationship noted above. In particular embodiments, the vertical alignment between the projector and sensor modules may be automatically verified at the time of manufacture/assembly of the device 15 in the following manner: (i) The pixel array 42 may be configured to repeatedly capture depth from a given row of pixels "R" (such as the row 63 in FIGS. 3-4). (ii) Let the projector module scan a scene (or the surface of a 3D object) as usual (i.e., using the point scan method described earlier with reference to FIGS. 2-3), with the vertical beam angle approaching the sensor row "R" being repeatedly captured. (iii) Monitor at what elevation beam angle ("α") the row being captured starts generating timestamps. This happens when the laser beam's vertical angle is such that laser spots become imaged at the row being repeatedly captured. Furthermore, it is desirable to also monitor at which vertical beam angle the timestamps stop being generated for the row "R" under test. As a result of these observations, it is possible to obtain one or more values for laser beam's vertical angles at which laser spots land on the row under test. Measurement accuracy can be increased further by averaging the obtained vertical angles and/or repeating measurements multiple times at slightly different vertical angles. It is noted here that this calibration verification approach assumes that the scene contains at least some diffusively-reflective 3D objects so that timestamps can be generated; however, object shapes and positions within the scene may not be important during verification.

Besides calibrating correspondence of the elevation angle α to the pixel array row number, it is also critical to calibrate the correspondence of the laser yaw angle to the time counter used for timestamping, such that the laser yaw angle β is known with accuracy at any given time to compute depth and ensure the temporal correspondence between each illuminated spot and the pixel imaging that spot.

The initial alignments discussed in the preceding paragraph may not remain "locked" forever. More particularly, the sensed depth depends on the alignment of the sensor module (i.e., the image sensor unit 24 in FIGS. 1-2) and its components, the projector module 22 and its components, and also the projector's laser turn-on delay. These alignments and delays may vary from one individual device to another, and may also vary over time, temperature, and power supply voltage. Thus, fluctuations in operating/ambient temperature, voltage, and other environmental conditions at run-time may affect the initial alignment. Therefore, it may be desirable to perform periodic calibrations at run-time to maintain the accuracy of depth measurements. Particular embodiments of the present disclosure provide for self-calibration (or automatic calibration) of the depth sensor device 15. Such calibration can periodically run in the background without interfering with the normal camera operation (2D or 3D imaging). Before discussing the automatic calibration with reference to the embodiments in FIGS. 8-13, a brief discussion of FIGS. 5-7 is provided to explain horizontal and vertical calibration errors that may arise in a point-scan based depth measurement system.

Figure 5A:
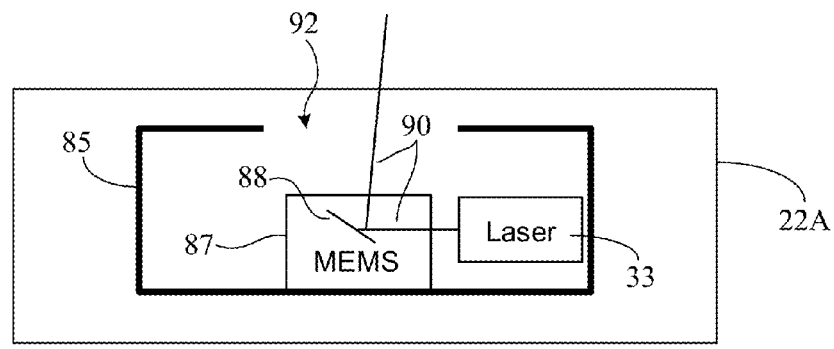
FIG. 5A shows exemplary details of a laser beam scanning portion of a projector module according to one embodiment of the present disclosure without the automatic calibration features.
Figure 5B:
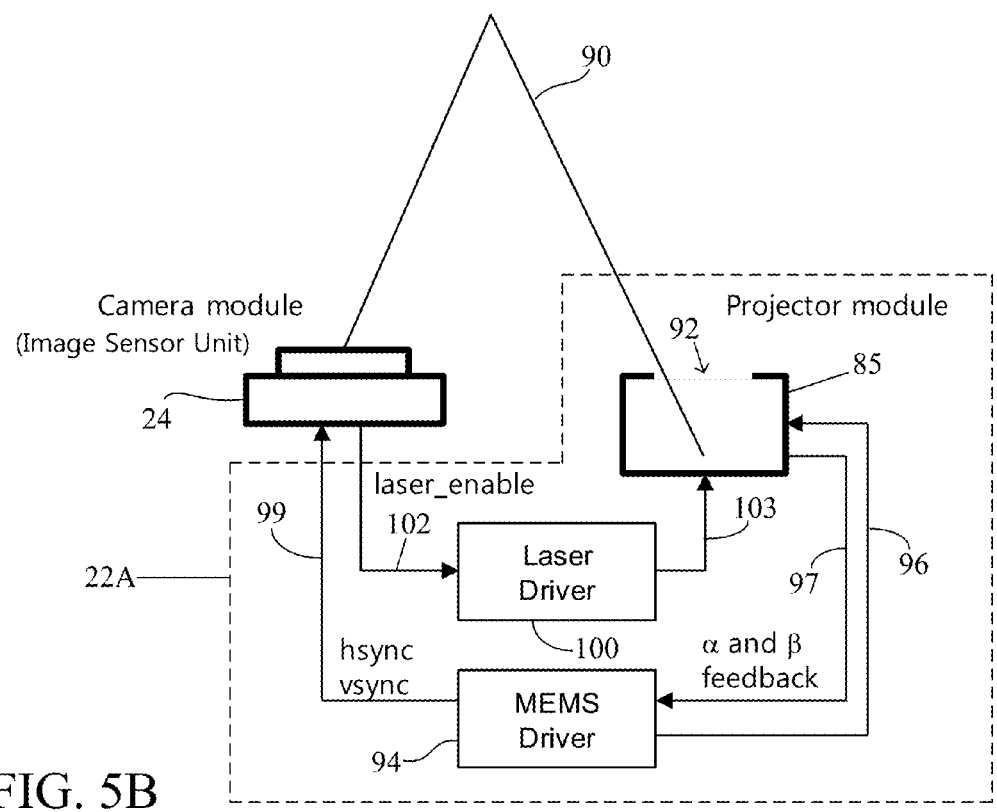
FIG. 5B provides additional architectural details of the exemplary projector module shown in the embodiment of FIG. 5A.
Figure 6:
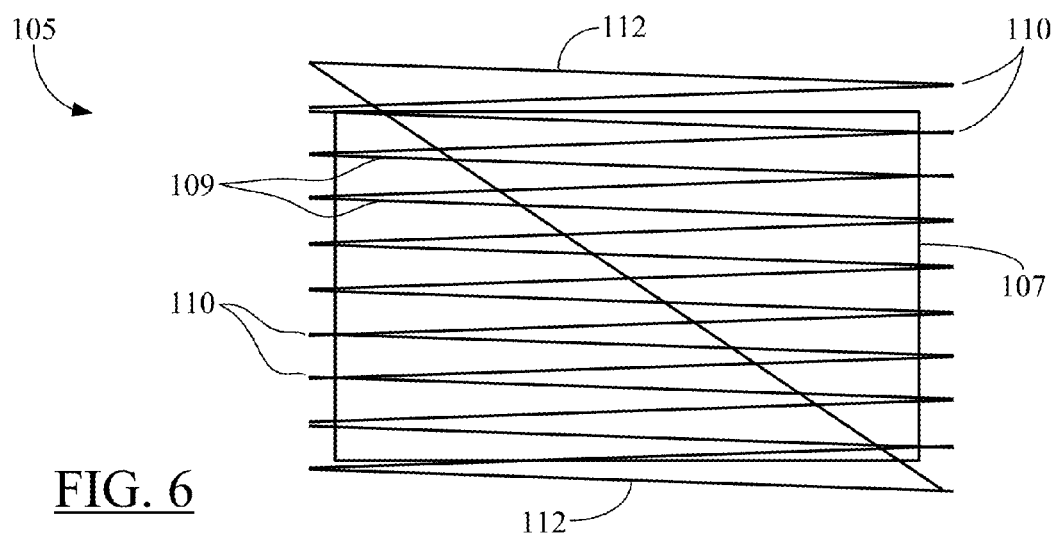
FIG. 6 illustrates an exemplary scanning pattern for a laser beam point scan according to one embodiment of the present disclosure.
Figure 9:
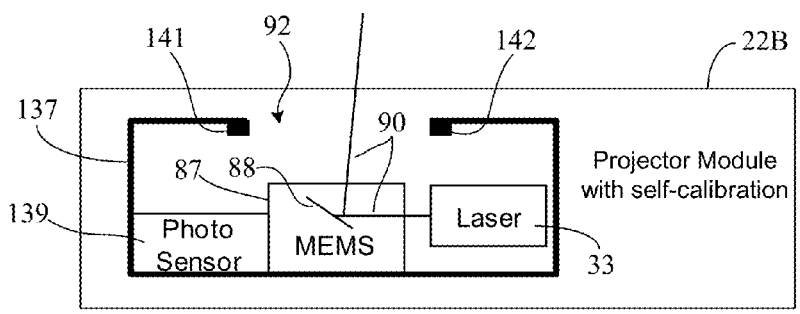
FIG. 9 shows exemplary details of a laser beam scanning portion of a projector module according to one embodiment of the present disclosure with the automatic calibration features.

FIG. 5A shows exemplary details of a laser beam scanning portion of a projector module 22A according to one embodiment of the present disclosure without the automatic calibration features. FIG. 5B provides additional architectural details of the exemplary projector module 22A shown in the embodiment of FIG. 5A. The projector module 22A may be considered as a version of the projector module 22 in FIGS. 1-2 that has no self-calibration capability. On the other hand, the projector module 22B discussed later with reference to FIGS. 9-10 is a version of the projector module 22 that has self-calibration capability. For ease of reference, FIGS. 5A and 5B are jointly discussed here, and may be collectively referred to as "FIG. 5".

As shown in the embodiment of FIG. 5A, the projector module 22A may include a rigid enclosure or housing 85 in which the laser light source 33 may be securely mounted along with a Micro Electro-Mechanical Systems (MEMS) scanner 87 to steer the laser beam. In one embodiment, the enclosure 85 may be made of the same material as that used for the external body of the device 15. Such material may be, for example, hardened plastic (like a polycarbonate material) that has good impact resistance, temperature resistance, and surface flexibility. Alternatively, impact-resistant metal alloys of aluminum and magnesium may be used for the outer casing of the system 15 as well as for the enclosure 85. Because the type or properties of such material are not relevant to the present disclosure, additional discussion of constructional details of the enclosure 85 are not provided for the sake of brevity. The MEMS scanner 87 may be a resonating-type MEMS scanner with a mirror 88 that resonates, swinging its angle "horizontally" side-to-side to steer the laser beam 90 through an opening 92 in the enclosure 85. It is noted here that, in particular embodiments, an electrostatic MEMS scanner may be used instead as well and the teachings of the present disclosure remain applicable to such embodiments as well. However, because the resonating-type MEMS scanner is more common and effective, the discussion herein assumes that the projector module 22 (and its two variants 22A and 22B) includes a resonating-type MEMS scanner. For example, the resonating-type MEMS scanner may utilize a single mirror that scans the scene in both X and Y dimensions or two mirrors, with the first mirror scanning in X direction and the second mirror scanning in the Y direction.

As discussed later with reference to FIG. 6, the opening 92 may define the boundaries of a field of scan on the surface of a 3D object—like the object 26 in FIGS. 2-4. The light spots may be projected in that field of scan along a plurality of scanning lines (such as the lines $S_R$, $S_{R+1}$, and so on, in FIG. 3). The opening 92 may be "surrounded" on two sides or on all four sides by the body portion of the enclosure 85. In particular embodiments, the opening 92 may be such that each scanning line may extend inside the enclosure 85 beyond the field of scan, as shown, in FIG. 11 (discussed later). Although not shown in FIGS. 5A-5B, the projection optics (or focusing lens) 35 (FIG. 2) may be placed in the opening 92 in certain embodiments. Thus, the two opposite ends of the opening 92 may be used to place or affix a focusing lens 35 to create an arrangement similar to that shown in FIG. 2. For ease of illustration and because of its lack of relevance to the present disclosure, no additional projection optics is shown in the embodiments of FIGS. 5A-5B (and also FIGS. 9-10).

For ease of illustration, only the enclosure 85 is shown in FIG. 5B without the internal components 33, 87. In FIG. 5B, the projector module 22A is shown coupled to the image sensor unit 24 (also referred to as a "camera module"), which receives and processes light spots reflected from the object surface (not shown) when the object is illuminated by the laser beam 90 using a point scan. The processing of light spots received during a point-scan of the object surface for depth measurement is already discussed before with reference to FIGS. 2-4 and, hence, such discussion is not repeated here. It is noted that the object surface may be point-scanned when the mirror 88 resonates horizontally (side-to-side). A MEMS driver 94 may be part of the projector module 22A to provide control signals 96 to the MEMS scanner 87 to precisely control the resonance of the mirror 88. In particular embodiments, the MEMS driver 94 may be an Integrated Circuit (IC) that is part of the light controller unit 34 and operatively coupled to the processor 19. When a user selects the 3D imaging mode, for example, the processor 19 may instruct the MEMS driver 94 to generate appropriate control signals needed for the point-scan. These control signals are symbolically illustrated by the arrow 96 in FIG. 5B. The control signals may instruct the MEMS scanner 87 to appropriately position the mirror 88 for horizontal and vertical scans, which are discussed in more detail later with reference to FIG. 6. The MEMS scanner 87 may provide analog feedback signals to the MEMS driver 94 indicating mirror orientation. For example, in one embodiment, the feedback signals may provide the angular values "α" and "β" (shown in FIGS. 3-4) for the laser spot to be projected next. These feedback signals are symbolically illustrated by the arrow 97 in FIG. 5B. Based on these feedback signals 97, the MEMS driver 94 may generate horizontal and vertical sync pulses—"hsync" and "vsync", respectively—to let the image processing circuit 46 in the sensor unit 24 know when each scan line and each frame start. These sync pulses are symbolically illustrated by the arrow 99 in FIG. 5B. The image sensor unit 24 may use these two signals—hsync and vsync—to generate a trigger signal to precisely (for example, with pico-second accuracy) pulse the laser source 33 during horizontal MEMS mirror scans and also to prepare for the capture of each depth row (along the appropriate row of pixels in the pixel array 42). This laser trigger signal (referred to herein as the "laser_enable" signal) may be supplied to a laser driver unit 100 to appropriately turn the laser 33 on or off, as symbolically illustrated by arrows 102 and 103 in FIG. 5B. Thus, the image sensor unit 24 may use the laser_enable signal to turn the laser beam on and off with precise timing during each horizontal beam scan. This controlled activation of the laser beam allows for co-ordination of the scanning and sensing operations for accurate depth measurements. Like the MEMS driver 94, in particular embodiments, the laser driver 100 also may be a dedicated IC that is a part of the light controller unit 34 within the projector module 22A. In addition to the laser_enable signal, the laser driver 100 also may provide other control or timing signals to the laser source 33.

It is noted here that, for ease of discussion, the reference numerals associated with various arrows in FIG. 5B (and also in FIG. 10) may be used—as per the context of discussion—to also refer to the corresponding signals themselves. For example, the reference numeral "102" may be used to refer to the "laser_enable" signal, the reference numeral "99" may be used to refer to either of the "hsync" and "vsync" signals, and so on.

FIG. 6 illustrates an exemplary scanning pattern 105 for a laser beam point scan according to one embodiment of the present disclosure. In the embodiment of FIG. 6, the scanning pattern 105 is a raster scan pattern where the laser beam 90 is point-scanned within a pre-defined field of scan (or field of view) 107 along a plurality of substantially-horizontal scanning lines 109. As noted before, the opening 92 in the housing 85 may define the boundaries of the field of scan 107 on the surface of a 3D object and the light spots may be projected—from left-to-right—in that field of scan along the scanning lines 109 (like the lines $S_R$, $S_{R+1}$, and so on, in FIG. 3). In particular embodiments, the opening 92 may be such that each scanning line 109 may extend inside the enclosure 85 beyond the boundaries of the field of scan 107—as indicated by the scanning line extensions (or endpoints) 110 in FIG. 6 and discussed in more detail with reference to FIG. 11. Furthermore, certain scanning lines—like the scanning lines 112 associated with initiation and conclusion of a raster scan (defining a "frame" of scan)—may fall completely outside of the field of scan 107. It is understood that the field of view 107 is shown as a solid-lined rectangle for ease of illustration only. In an actual raster scan, no such rectangular boundary/outline is projected or visible. In certain embodiments, the dimensions of the field of view (or field of scan) 107 may be selected to substantially equal the shape of an "active" portion of rows of pixels in the 2D array 42. Here, it is assumed that the active portion of each row of pixels in the 2D array 42 contains the same number of pixels. The "active" portion may refer to those rows of pixels which actually receive light from the object 26 during the laser scan and from which the corresponding pixel-specific output signals are received and processed for 3D depth calculations. Thus, in the embodiment of FIG. 6, there may not be any rows of pixels associated with the scanning lines 112 or any extra rows of pixels associated with the scanning lines 112 may be considered to be outside the active rows in the pixel array 42 and, hence, the pixel outputs from such "non-active" rows may be ignored during 3D depth calculations.

It is noted that the frequency of the horizontal scan may be determined by the horizontal oscillation frequency of the mirror 88 (FIG. 5A). Usually, the horizontal oscillation frequency of the mirror 88 is constant—such as, for example, 1080 lines per frame for a full High Definition (HD) point scan within the field of view 107—and is mainly determined by mechanical dimensions and properties of the mirror 88 and the spring (not shown) that holds the mirror inside the MEMS scanner 87. Furthermore, the horizontal scan frequency may be generally quite stable—for example, within several hertz over a second. In the raster scan of FIG. 6, as the laser beam is steered horizontally (by the MEMS scanner 87), the steering speed may reach its maximum in the middle of the scan because the MEMS mirror 88 must slow down near the scan endpoints 110 to reverse its scanning direction. On the other hand, the mirror 88 may not resonate with variable speeds during the vertical scans. Typically, the MEMS driver 94 may cause the scanner mirror 88 to rotate with a constant vertical speed during the frame time (which may be the time it takes to complete a scan from the top to bottom scan lines 112). When the frame time is over, the MEMS driver 94 may quickly rotate the mirror 88 vertically back to its initial vertical position.

As noted above, the horizontal scan frequency may be generally quite stable. Furthermore, the MEMS driver 94 can only slightly influence the horizontal frequency. However, the horizontal frequency still may vary—not insignificantly—with fluctuations/variations in the ambient/operating temperature and other environmental conditions. Additionally, any inappropriate delay in the application of the laser_enable signal 102 to the laser source 33 may affect the horizontal beam scan as well. For example, as mentioned earlier, in the embodiment of FIG. 5B, the sensor unit 24 may use the laser_enable signal 102 to turn the laser beam on and off with precise timing during each horizontal beam scan. However, such precise timing is complicated by: (i) the signal propagation delay from the image sensor unit 24, through the laser driver 100, to the laser source 33, and (ii) the turn-on time of the laser 33. All of these delays depend on component temperature, process, and voltage.

Errors in vertical and/or horizontal scan frequencies are essentially errors in corresponding scan angles "α" and "β" (shown in FIGS. 3-4). Errors in vertical and/or horizontal beam angles may introduce errors in respective depth measurements.

Figure 7A:
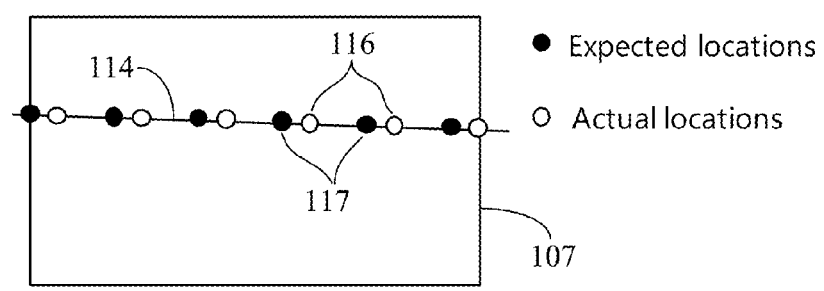
FIG. 7A-7B show exemplary illustrations of horizontal and vertical scanning errors, respectively, that may occur in a laser point scan.
Figure 7B:
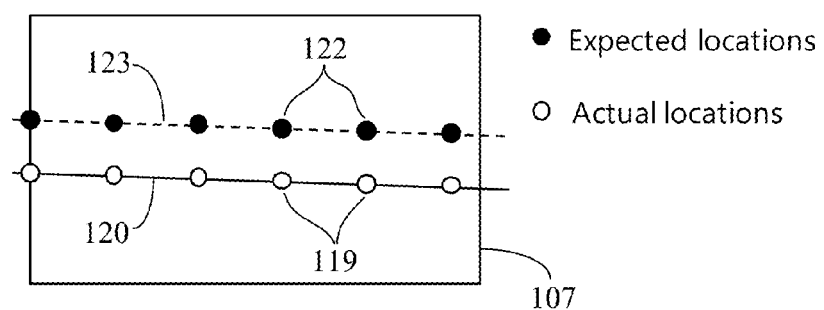

FIG. 7A-7B (collectively "FIG. 7") show exemplary illustrations of horizontal and vertical scanning errors, respectively, that may occur in a laser point scan. In FIG. 7A, the field of scan 107 is shown with a single scanning line 114 (similar to any of the scanning lines 109 in FIG. 6) where laser spots have shifted horizontally due to errors in the horizontal beam angle ("β"). Thus, as shown in FIG. 7A, the actual locations of laser spots 116 are the horizontally-shifted versions of the expected locations 117. In other words, the errors in the horizontal beam angle effectively "propagate" into measurement errors of (x, y) coordinates of each laser spot in the scene and the associated measured distance (depth). On the other hand, errors in the vertical beam angle ("α") may cause the camera module (or image sensor) 24 to stop imaging laser spots in the scene. This basically entirely breaks the depth capture as illustrated in FIG. 7B. For example, an error in the vertical beam angle may cause the laser pulses to be projected higher or lower than expected as shown in FIG. 7B, where the laser spots 119 projected along the actual scan line 120 (similar to any of the scanning lines 109 in FIG. 6) in the field of scan 107 are shown to have landed on locations lower than the expected locations 122 along the scan line 123 because of a vertical beam error. As a result, the actual (erroneous) laser spots 119 occur outside of the epipolar plane because they do not fall on the epipolar line associated with the expected scanning line 123 in the pixel array 42. Since the camera module or the image sensor unit 24 senses depth from the laser spots occurring only within the epipolar plane, laser pulses with vertical error become effectively invisible to the image sensor 24.

Because the beam angle errors (horizontal and/or vertical) change over time (for example, on the order of minutes), it is desirable to sense the laser beam angles (horizontal and vertical) and compensate them for any errors in real time (for example, once every few seconds). Furthermore, as noted before, sensed depth depends on the alignment of the image sensor module and its components, the projector module and its components, and also on the projector's laser turn-on delay. These alignments and delays may vary from one individual device to another, and may also vary over time, temperature, and power supply voltage. As mentioned earlier, the discussion of FIGS. 8-13 relate to how reflective marker-based automatic calibration according to the teachings of the present disclosure may be implemented in particular embodiments to ameliorate or rectify various calibration errors in a depth sensor that utilizes epipolar geometry and a scanning beam projector.

Figure 8:
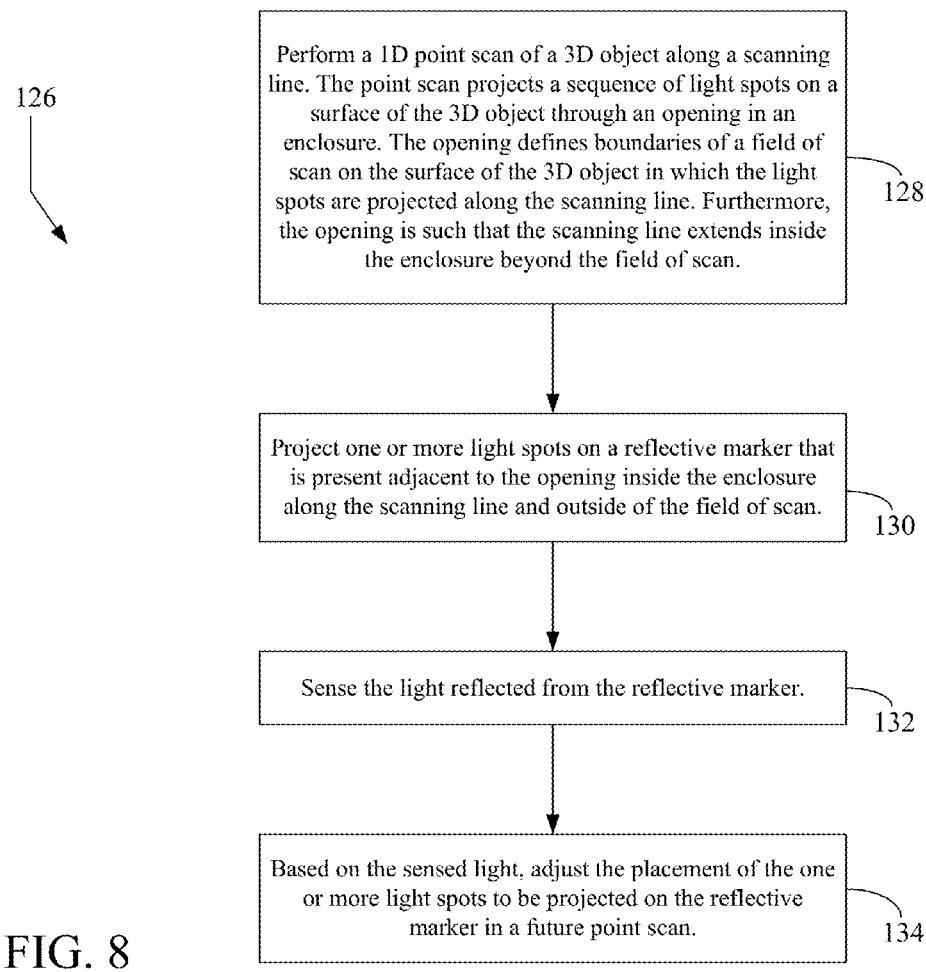
FIG. 8 is an exemplary flowchart that illustrates how a reflective marker inside the enclosure of a projector module may be used according to one embodiment of the present disclosure to adjust the placement of the light spots during a point scan so as to effectively provide an automatic calibration of a 3D depth sensor.

FIG. 8 is an exemplary flowchart 126 that illustrates how a reflective marker inside the enclosure of a projector module may be used according to one embodiment of the present disclosure to adjust the placement of the light spots during a point scan so as to effectively provide an automatic calibration of a 3D depth sensor (such as the imaging module 17 or the imaging device 15 in FIG. 1). Various constructional and operational details of a reflective marker-based projector module are provided later with reference to discussion of FIGS. 9-13. It is noted that various steps illustrated in FIG. 8 may be performed by a single module or a combination of modules or system components in the system 15. In the discussion herein, by way of an example only, specific tasks are described as being performed by specific modules or system components. However, other modules or system components may be suitably configured to perform such tasks as well.

In FIG. 8, at block 128, the system 15 (more specifically, the processor 19 along with the projector module 22) may perform a one-dimensional (1D) point scan of a 3D object, such as the object 26 in FIG. 2, along a scanning line (like one of the scanning lines 109 in FIG. 6). A light source, such as the projector module 22, may be used for the point scan. As part of the point scan, the projector module 22 may be configured, for example, by the processor 19, to project a sequence of light spots on a surface of the 3D object 26 through an opening in an enclosure. (FIGS. 9-10, discussed later, show such an enclosure 137 with the opening 92.) The opening may define boundaries of a field of scan on the surface of the 3D object in which the light spots are projected along the scanning line. Furthermore, the opening may be such that the scanning line may extend inside the enclosure beyond the field of scan, as indicated, for example, by the scanning line extensions (or endpoints) 110 in FIG. 6 and discussed in more detail later with reference to FIG. 11. At block 130 in FIG. 8, the projector module 22—more specifically, the MEMS driver 94 and the laser light source 33 in the projector module 22—may be configured by the processor 19 to project one or more light spots on a reflective marker. The reflective marker-based projector module is shown in FIGS. 9-10 (discussed later). In one embodiment, the reflective marker may be present adjacent to the opening inside the enclosure along the scanning line and outside of the field of scan, as shown, for example, in FIG. 11. At block 132, the light reflected from the reflective marker may be sensed. In particular embodiments, such sensing may be performed using a photo-sensor also included within the enclosure containing the reflective marker, the laser light source, and the MEMS scanner 87. Such photo sensors are shown in the embodiments of FIGS. 9-10, discussed below. At block 134, the self-calibration may be performed based on the sensed light (at block 132). In particular embodiments, the self-calibration may include adjusting the placement of one or more light spots to be projected on the reflective marker in a future point scan. As part of such adjustment, the timing of the laser trigger signal (the laser_enable signal 102) may be adjusted—for example, by the image sensor unit 24 under operative control of the processor 19—so as to control future activation of the laser light source to improve physical placement of a subsequent light spot. Additional details of such timing adjustment are provided later with reference to FIG. 12. The automatic calibration process outlined in FIG. 8 may be periodically performed in the "background" without interfering with the normal camera operation during 3D depth measurements.

FIG. 9 shows exemplary details of a laser beam scanning portion of a projector module 22B according to one embodiment of the present disclosure with the automatic calibration features. The projector module 22B may be considered as a version of the projector module 22 in FIGS. 1-2 that has self-calibration capability. The projector module 22B in FIG. 9 (and also in FIG. 10) is a modified version of the projector module 22A in FIG. 5A and, hence, components or structures common between these two figures are identified using the same reference numeral for ease of discussion and related discussion is not repeated for the sake of brevity. A different reference numeral "137" is used to refer to the housing/enclosure in FIG. 9 to distinguish it from the housing 85 in FIG. 5A, even though the housing 137 is essentially a slightly modified version of the previously-discussed housing 85. In any event, like the earlier housing 85, the housing 137 in FIG. 9 may be made of hardened plastic, impact resistant metal alloys, or a material that is also used for the external body of the device 15.

To make automatic calibration (or self-calibration) possible as per teachings of the present disclosure, the projector module 22B may be augmented with a light-sensing element 139 and at least one patterned marking (or marker) inside the enclosure 137. Two such exemplary markings 141-142 are shown in the embodiment of FIG. 9. However, a single marker-based embodiment may be devised to implement the self-calibration methodology as per teachings of particular embodiments of the present disclosure. The light-sensing element 139 may be a photo sensor such as, for example, a photocell. The markings 141-142 may have a reflective surface and, hence, when the laser beam is projected over the markings 141-142, they may reflect the incident laser light. The reflective surface may be of diffusive type. The reflected light, in turn, may be sensed using the newly-added sensing element 139, which may responsively generate an output. The output of the light-sensing element 139 may be analyzed to perform automatic calibration as discussed in more detail with reference to FIGS. 10-13. Briefly, the photo sensor output may be analyzed to modify the timing of the trigger signal (the laser_enable signal) applied to the laser light source so as to adjust the physical placement of the subsequent light spots to be projected on the reflective markers in the future. Thus, by using special arrangements of reflective markings, it may be possible to determine the exact direction and speed of the scanning beam over time. If the light spots are properly-aligned with respect to the markers 141-142, then they will remain aligned with the respective scanning line when projected outside of the opening 92. In that case, the angular errors shown in FIGS. 7A-7B may not arise and, hence, accurate depth sensing may be maintained. Such self-calibration may be periodically run in the background without interfering with the normal camera operation (2D or 2D-3D).

Thus, in particular embodiments, self-calibration can be accomplished—as discussed in more detail with reference to FIGS. 10-13—by adding the following two components inside the enclosure/housing 137 of the projector module 22B: (i) A set of reflective markers 141-142, located inside the enclosure 137 and around the enclosure's opening 92. (ii) A photo-sensor cell 139 positioned inside the housing 137 to receive the light reflected by each marker 141-142. A single photocell 139 or a single, commercially-available photocell unit may suffice to sense the reflected light. In particular embodiments, the output of the photocell 139 may be preferably connected to the camera module 24 as shown in FIG. 10 and discussed in more detail below.

In certain embodiments, the markers 141-142 may be precision-printed, affixed, glued, or otherwise created on the inside surface of the enclosure 137 near the opening 92. The markers 141-142 may be manufactured along with the enclosure 137 as an integral part thereof. A reflective coating may be applied to the markers 141-142 to make them reflect the incident laser light. The color or type of such reflective coating may not be relevant because the photo sensor 139 may simply sense the reflected light, regardless of its color. Alternatively, the markers 141-142 may be affixed, glued, precision-printed, or otherwise-applied onto the inside surface near the opening 92 after the enclosure 137 is manufactured or fabricated. Each reflective marker may be of a pre-defined geometrical shape. Although only rectangular markers are shown in the embodiments of FIGS. 9-11 and 13, the markers may be of any other geometrical shape such as, for example, square, hexagonal, circular, oval-shaped, and the like. Additional placement and configuration options for markers, and operational details of various marker-based configurations are discussed below with reference to FIGS. 11-13.

FIG. 10 provides additional architectural details of the exemplary projector module 22B shown in the embodiment of FIG. 9. For ease of illustration, the dotted outline shown in FIG. 9 for the projector module 22B is not shown in FIG. 10. For ease of illustration, only the newly-added components—the pair of reflective markers 141-142 and the photo-sensor 139—are shown inside the enclosure 137. Furthermore, for the sake of brevity, the earlier discussion of various processing blocks (like the laser driver 100, the MEMS driver 94, etc.) and input/output signals (like the laser_enable signal 102, the angle feedback signals 97, and so on) common between the embodiments of FIG. 5B and FIG. 10 is not repeated.

As more clearly shown in FIG. 11, the reflective markers 141-142 may be placed inside the enclosure 137 and around the projector opening 92. As the laser beam 90 passes over a marker, the marker reflects the beam. The photocell 139 may sense the resulting reflected light and generate an analog pulse 145, which is identified as the "sense_marker" output signal in FIG. 10. The analog pulse corresponds to the instantaneous brightness sensed by the photo cell. In some embodiments, the intensity of the reflected light may be sensed as well. The photocell output 145 (the sense_marker pulse) may be sent to the image sensor unit 24, where the sense_marker signal 145 may be analyzed—under operative control of the processor 19 (FIG. 2)—to adjust the timing delay of the laser_enable signal 102 so as to coordinate the projection of laser spots such that the scanning errors, like those illustrated in FIGS. 7A-7B, may be substantially minimized or eliminated. As mentioned before, this self-calibration approach does not interrupt or interfere with the normal camera operation.

Figure 12:
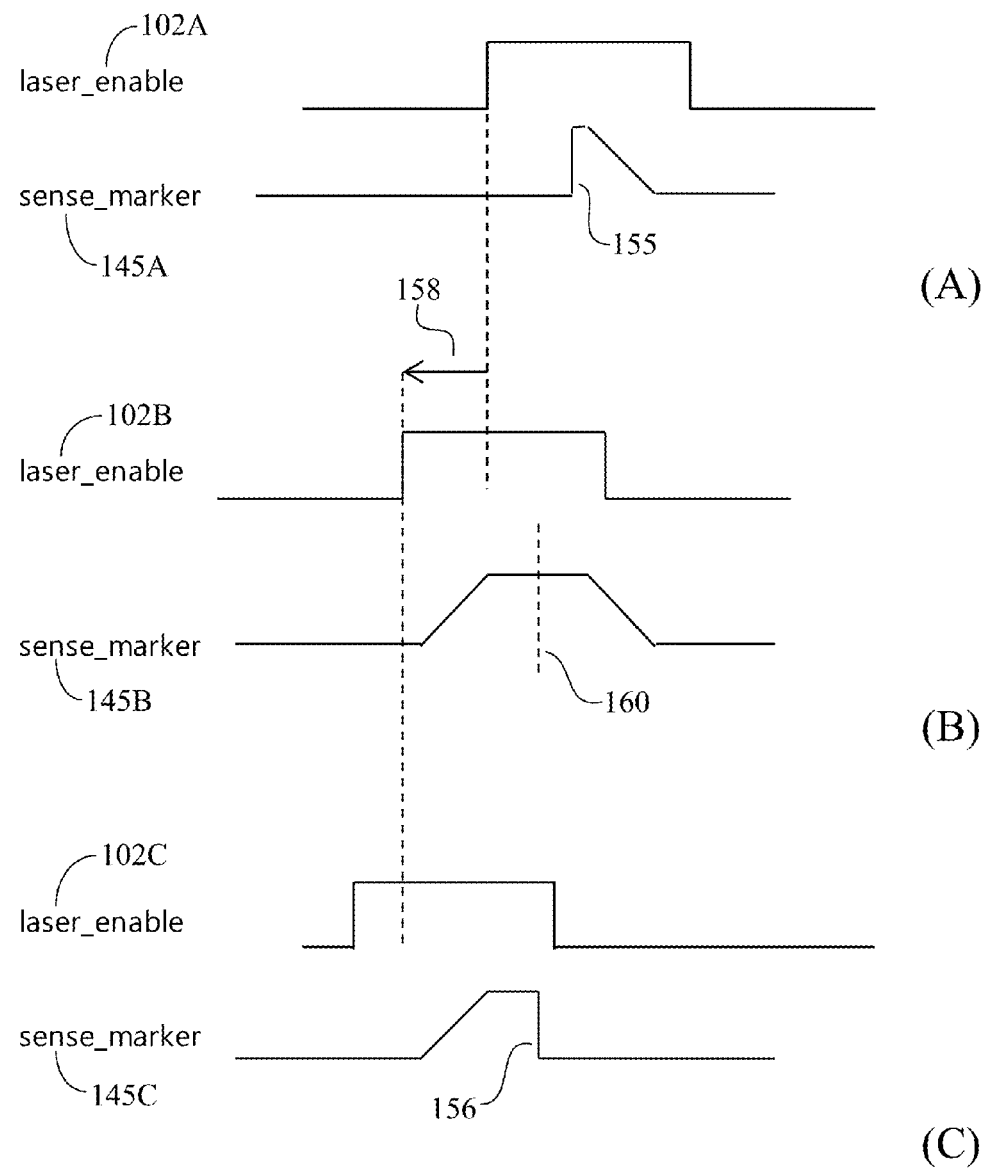
FIG. 12 is a set of simplified waveforms illustrating how the signals received from a photo sensor may be used to adjust the delay timing of the laser-enabling pulse to accomplish horizontal calibration according to one embodiment of the present disclosure.

It is noted here that the photocell 139 should be preferably placed inside the enclosure 137 at such a location that the photocell 139 does not "see" the opening 92 or sense the ambient light entering from the opening. Rather, the photocell 139 should preferably sense only the light internally reflected by the markers 141-142. In certain embodiments, the photocell 139 may have a high-speed amplifier built-in to buffer the analog signal 145—which may have sharp rise and fall transition times (as shown in FIG. 12, discussed later)—before it is sent to the camera module 24. In particular embodiments, two or more photocells (not shown) may be placed at different locations within the enclosure 137 of the projector module 22B. In such an arrangement, different photocells may be dedicated to sense reflected light from a pre-designated reflective marker(s). For example, in the context of FIG. 10, one photocell may be dedicated to sense the reflected light only from the marker 141, whereas another photocell may sense the reflected light from the marker 142 only.

FIG. 11 illustrates an exemplary magnified diagram of how laser spots may be sensed using one or more reflective markers 141-142 for automatic calibration of the system 15 in FIG. 1 according to one embodiment of the present disclosure. Such calibration is primarily performed to maintain the accuracy of 3D depth measurements and, hence, in certain embodiments, the calibration may be carried out only when 3D imaging mode is activated. In FIG. 11, the reference numeral "147" is used to identify the portion of the internal surface of the enclosure 137 that contains the reflective marker 141. Similarly, the reference numeral "148" is used to identify the opposite side of the surface 147 having the reflective marker 142. As shown, these two portions of the internal surface of the enclosure 137 are separated by the opening 92 and each marker 141-142 may be substantially aligned with the opening 92. It is noted here that, in particular embodiments, the enclosure 137 may contain only a single reflective marker 141; the second marker 142 may be absent. In other words, it may not be necessary to have more than one marker to implement the self-calibration process discussed herein. Therefore, the surface block 148 and the marker 142 in FIG. 11 are shown using dotted lines to illustrate that the second marker 142 may not be present in certain embodiments. However, the discussion of FIG. 11 below relates to a two-marker embodiment—one marker on each opposite side of the opening 92, as shown.

The raster scan pattern shown in FIG. 11 is identical to the pattern 105 shown in FIG. 6 and, hence, the same reference numerals are used in FIG. 11. However, for ease of discussion, one of the scanning lines 109 in FIG. 11 is identified using a different reference numeral "150", and its endpoints are shown circled with reference numerals "110A" and "110B." In the raster scan, the scanning lines 109 may be substantially horizontal, and a frame of scan may constitute all scanning lines between the top and bottom lines 112. During the "regular" operation (such as, for example, performing depth sensing in a 3D imaging mode), the laser beam 90 exits the opening 92 in the enclosure 137 to point-scan the scene. As noted before, in the point scan, a sequence of light spots may be projected on a surface of a 3D object in the scene. The opening 92 defines the boundaries of the field of scan 107 (on the surface of the 3D object) in which the light spots are projected along the scanning lines 109. The dimensions of the opening 92 maybe such that each of the plurality of scanning lines 109 may slightly extend inside the enclosure 137 beyond the field of scan 107. The endpoints 110 in FIG. 6 represent such extensions. Thus, during the above-mentioned "regular" operation, the laser source 33 may be disabled—such as, for example, by de-asserting the laser_enable output 102 from the camera module 24—when its beam points inside the enclosure 137. However, during calibration, the laser_enable signal 102 may be asserted to turn the laser 33 on while the beam is pointing inside the enclosure 137. In other words, during calibration, one or both endpoints of a scanning line may be point-scanned as well. In this manner, one or more light spots may be projected on each marker 141-142 (because the markers are present in the region associated with the endpoints). One such light spot 152 is shown in FIG. 11 as being projected on the left marker 141 when the laser beam 90 is point-scanned (from left-to-right) along the scanning line 150.

In particular embodiments of the present disclosure, a reflective marker—such as any of the markers 141-142—may be present inside the enclosure 137 along at least one scanning line and outside of the field of scan. In other words, the reflective marker will be in the path of the laser spots being projected along that scanning line. If a reflective marker is vertically substantially as long as the length of the opening 92 or the field of scan 107, such a reflective marker may be able to receive laser spot(s) projected along any of the scanning lines 109 in the field of scan 107, and not just from a subset of the scanning lines 109—as may be the case for the "shorter" markers 141-142 in FIG. 11. In particular embodiments, a "regular" marker may be at least as large as a light spot. In other words, the marker may be wide enough to "encompass" the entire light spot. On the other hand, in certain embodiments, a marker may be smaller than a light spot, in which case a portion of the light spot may remain projected outside of the marker. Such a smaller marker-based configuration is shown in the embodiment of FIG. 13C, discussed below.

As noted before, the calibration may be performed along with the "regular" point scan for 3D imaging because the 2D pixel array 42 is not needed to sense the light reflected by the markers. Thus, the 3D depth measurement operation using the pixel-based sensing can continue along with the sensing of marker-reflected light by the photo sensor 139. In other words, the marker-based calibration approach may run in the "background" without interfering with the normal 3D camera operation. In certain embodiments, this can allow multiple calibration operations during a single frame of scan, thereby significantly improving the precision of regular 3D imaging operation.

As mentioned before, during a non-calibration related horizontal scan, the laser light source 33 may be typically enabled around the time the laser beam angle indicates that the laser beam will "enter" the projector module's opening 92. The laser beam angle may be approximated (for example, by the image sensor unit 24) in advance by monitoring the hsync and vsync signals 99 supplied by the MEMS driver 94. Because of the availability of this advance approximation, the image sensor unit 24—under the operative control of the processor 19—can also determine approximately when to turn the laser beam on/off to have it scanned over a reflective marker—such as the marker 141—during self-calibration. Thus, while the laser spot 152 has not exited the enclosure, the laser spot is reflected from the reflective marker 141 placed on the edge of the projector opening 92. The photocell 139 may pick up the reflected light and output an analog signal—the sense_marker pulse 145—to the image sensor unit 24. The discussion of FIG. 12 below relates to the analysis of the photocell output, for example, by the image sensor unit 24, and subsequent timing adjustment of the laser triggering pulse (the laser_enable signal 102).

FIG. 12 is a set of simplified waveforms illustrating how the signals received from a photo sensor, such as the photo sensor 139, may be used to adjust the delay timing of the laser-enabling pulse 102 to accomplish horizontal calibration according to one embodiment of the present disclosure. As noted before, the image sensor 24 may turn on the laser_enable pulse 102 when the laser beam 90 is expected to be approaching the reflective marker—such as the marker 141 in FIG. 11. The exact position of the laser beam may not be known at this time because the hsync and vsync information signals 99 may simply provide an approximation of the laser beam angle. However, it may be desirable to align the midpoint of the laser_enable signal 102 to physically correspond to the middle of the laser beam—which is to be projected as the laser spot 152 in FIG. 11—pointing at the middle of the reflective marker 141. Such an alignment would accomplish horizontal calibration because it would establish a precise correspondence between the timing of the laser_enable signal 102 and the actual, physical position of the horizontal beam.

The photo sensor 139 may generate the sense_marker pulse 145 every time it senses the light reflected from a reflective marker—such as the marker 141 in FIG. 11. Thus, as the laser beam starts passing over the reflective marker 141 in FIG. 11, the photo cell starts generating its output signal—the sense_marker pulse 145. When the midpoint of the laser_enable signal 102 is substantially aligned with the reflective marker's center, the photo cell output signal (the sense_marker signal) may appear symmetrical and may have the maximum Area-Under-the-Curve (AUC). This indicates a successful horizontal calibration. On the other hand, when the calibration is off, the sense_marker signal 145 may appear asymmetric and its AUC will reduce. Thus, an analysis of the sense_marker signal 145 may be performed by the image sensor unit 24 (under the operative control of the processor 19), or by the processor 19 itself, to compare the rise and fall times of the sense_marker signal 145 to determine whether the signal 145 is symmetrical around a midpoint. The analysis may also include determination of the AUC of the sense_marker signal 145. Based on such determination, the image sensor unit 24 may perform adjustment of the timing delay of the laser_enable signal (as discussed below) to maximize the AUC of the sense_marker signal 145.

In FIG. 12, the part-A shows exemplary signal waveforms 102A, 145A before calibration. Here, the laser_enable signal 102A comes too late, thereby causing the sense_marker pulse 145A to have a sharp rise transition 155. In case of the reflective marker 141 in FIG. 11, a laser trigger signal—like the general laser_enable signal 102 in FIG. 10—may be considered to arrive "too late" when the corresponding laser spot 152 is projected only over a part of the reflective marker and the projection commences only after a substantial portion of the reflective marker is missed along the scanning line. The laser spot 152 in FIG. 11 is an illustrative example of such a "too late" event.

The part-C in FIG. 12 also shows exemplary signal waveforms 102C and 145C before calibration. However, in contrast with the laser_enable signal 102A in part-A, the laser_enable signal 102C in part-C comes too early, thereby causing the sense_marker pulse 145C to have a sharp falling transition 156. The laser_enable signal may be considered to arrive "too early" when the projection of the corresponding laser spot commences well before the reflective marker is encountered along the scanning line, thereby missing a substantial portion of the reflective marker.

On the other hand, the part-B in FIG. 12 shows exemplary signal waveforms 102B, 145B after calibration. In the set of waveforms in part-B, the timing delay of the laser_enable signal 102B has been adjusted by the image sensor unit 24 (or directly by the processor 19), as indicated by the arrow 158 in FIG. 12. Such adjustment may also make the sense_marker signal 145B substantially symmetrical around a mid-point (which is indicated by the dotted line 160 in FIG. 12) and its AUC is maximized. This indicates that the center of the laser_enable pulse 102B is now precisely aligned over the center of the reflective marker—such as the marker 141 in FIG. 11.

Thus, to accomplish calibration, the image sensor unit 24 (under operative control of the processor 19) may attempt the calibration over several horizontal scans. In one embodiment, these scans may be sequential. However, in another embodiment, the scans may not be sequential; the calibration may be attempted every few scans. Each calibration attempt may consist of generating the laser_enable pulse for calibration against a known reflective marker, and observing the resulting sense_marker pulse, its shape, and its AUC (i.e., its integral). Until AUC is maximized, the image sensor unit 24 may continue adjusting the output delay for the laser_enable signal (with respect to hsync) and keep repeating the calibration. In particular embodiments, the image sensor unit 24 may already include the circuit capable of performing such adjustment. The adjustment may be in pre-determined, discrete steps or in a continuous manner— like a straight line. Also, in one embodiment, a two-step approach may be used for the adjustment: a coarse adjustment may be performed initially, followed by a fine adjustment. In certain embodiments, the image sensor unit 24 may compare the rise and fall times of the sense_marker pulse to determine whether to increase or decrease the delay timings of the laser_enable signal. The measurement precision may be further increased by taking the measurements repeatedly and averaging out the noise. For example, in one embodiments, multiple measurements may be repeated during a single frame scan. Alternatively, in another embodiment, multiple measurements may be carried out over several frame scans—consecutive or non-consecutive.

FIGS. 13A-13D (collectively "FIG. 13") show exemplary sizes and arrangements of reflective markers, and associated details of horizontal and vertical alignments/calibrations, according particular embodiments of the present disclosure. For ease of discussion, the same reference numerals are used in FIGS. 11 and 13 to the extent possible. For example, the same reference numerals "152," "90", and "147" are used in FIGS. 11 and 13 to refer to the laser spot, the laser beam, and the enclosure surface portion, respectively. Furthermore, although different embodiments are shown in FIGS. 13A-13D, the same reference numerals are used across these figures to illustrate different marker-based configurations that may be possible for the enclosure 137 in different embodiments. For example, the same reference numeral "141" is used in FIGS. 13A-13C simply to illustrate that the same reflective marker 141 may have different sizes (or shapes) in different configurations of the enclosure 137. As before, all such illustrations are exemplary only.

Figure 13A:
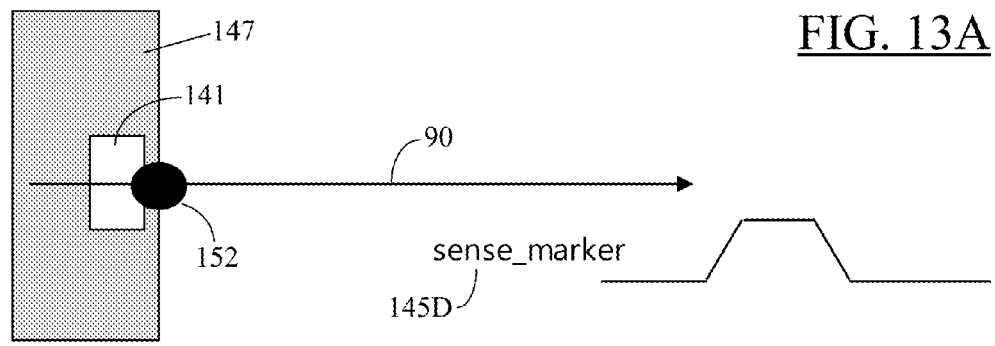
FIGS. 13A-13D show exemplary sizes and arrangements of reflective markers, and associated details of horizontal and vertical alignments/calibrations, according to particular embodiments of the present disclosure.

FIG. 13A shows an embodiment where a single rectangular marker 141 may be used to align the laser timing with the horizontal beam angle. Furthermore, some conclusions about the shape of the laser spot (or laser beam shape) also can be inferred from the single rectangular marker 141. The illustration in FIG. 13A is essentially the same as the left-hand portion in FIG. 11, where the reference numeral "147" refers to the portion of the internal surface of the enclosure 137 that contains the reflective marker 141. As mentioned earlier, in particular embodiments, only a single marker—like the marker 141 in FIG. 13A—may be employed. In other words, all embodiments may not have a pair of oppositely-placed markers 141-142 as shown in FIGS. 10-11. On the other hand, the embodiment in FIG. 13A (and the embodiments in FIGS. 13B, 13C, and 13D(i)) may have one or more markers (like the marker 142 in FIGS. 10-11) present on the other surface (not shown) of the enclosure 137. As discussed before, when the laser_enable signal is "aligned" with the marker, the resulting sense_marker pulse may have the shape as shown by the signal 145D in FIG. 13A.

Figure 13B:
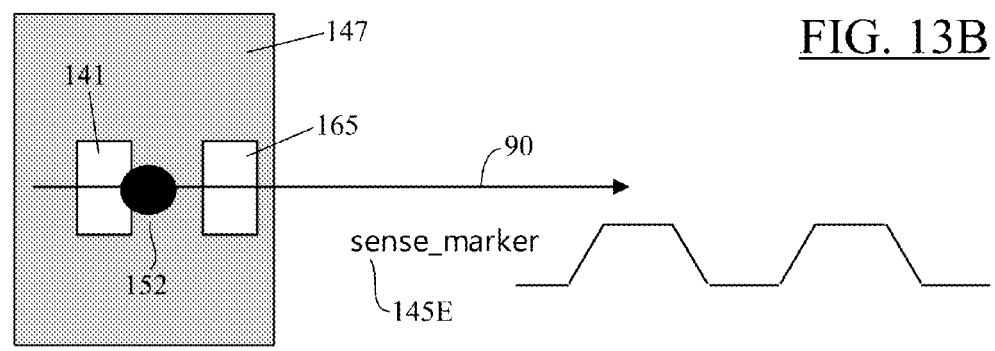
Figure 13C:
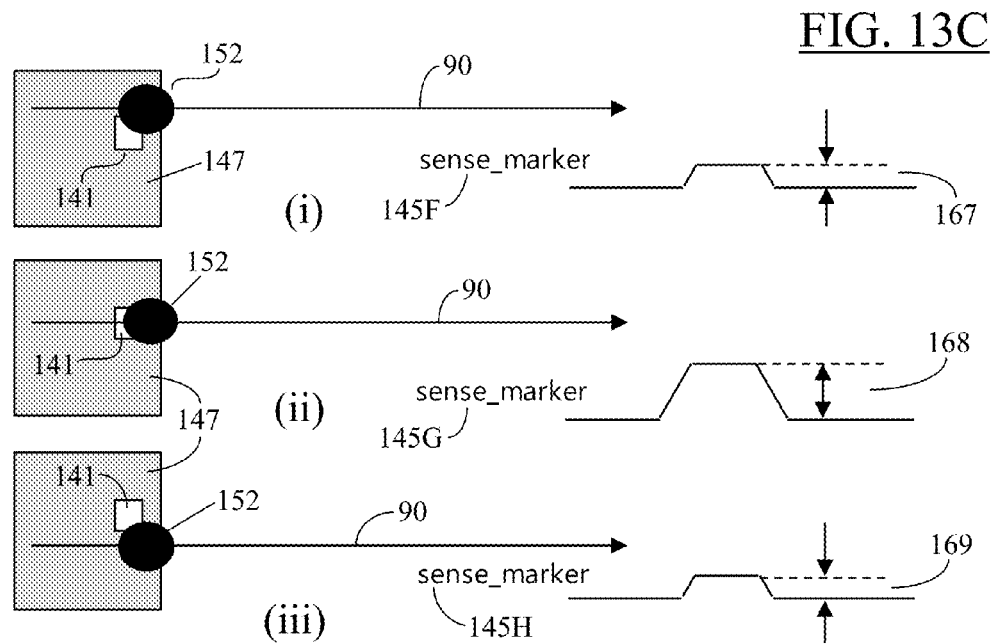

In some embodiments, the enclosure surface 147 may contain a series of two or more rectangular markers to measure horizontal angular beam speed. For example, in the embodiment of FIG. 13B, the surface portion 147 is shown to be containing two rectangular markers 141 and 165, which may result in the generation of two sense_marker pulses—as shown by the exemplary waveform 145E in FIG. 13B. Although only one laser spot 152 is shown, it is understood that two laser spots may be projected in the marker configuration of FIG. 13B—a different laser spot on each marker 141, 165. The reflected light from each marker would eventually result in generation of the sense_marker waveform 145E with two sense_marker pulses—one pulse per marker. In the embodiment of FIG. 13B, the laser_enable signal is assumed to be "aligned" with the markers 141, 165, thereby resulting in the AUC-maximized sense_marker pulses. The marker configuration in FIG. 13B may be used to determine the horizontal angular beam speed, which may be given by the ratio: (distance between marker centers)/ (distance between centers of sense_marker pulses).

As shown, the two or more rectangular markers in the embodiment of FIG. 13B may be mutually substantially horizontally-aligned and may be present along at least one scanning line outside of the field of scan. Furthermore, as noted before, in particular embodiments, such multiple markers may be present on each side of the opening inside the enclosure, and each marker may be substantially aligned with the opening.

Furthermore, horizontal scan time can be measured by placing markers on opposite projector opening sides—as, for example, in the embodiments of FIGS. 9-10. In certain embodiments, a small square or round marker may be used to map out the shape of a laser spot. This may require several horizontal scans over the marker.

For vertical alignment, either a smaller or a regular-sized marker can be used. As mentioned before, a "regular" marker may be at least as large as a light spot, whereas a "smaller" marker may be smaller than a regular marker. In the embodiment of FIGS. 13A-13B, regular markers are shown. However, in parts (i)-(iii) in the embodiment of FIG. 13C, the marker 141 is a smaller marker. When using a smaller marker, the sense_marker signal may be observed over several horizontal scans. As shown by the sense_marker waveforms 145F, 145G, and 145H in FIG. 13C, the sense_marker amplitude may vary in relation to the vertical beam angle. For example, the sense_marker pulse 145F in FIG. 13C(i) has an amplitude identified by the reference numeral "167", the sense_marker pulse 145G in FIG. 13C(ii) has an amplitude identified by the reference numeral "168," and the sense_marker pulse 145H in FIG. 13C(iii) has an amplitude given by the reference numeral "169." The largest sense_marker amplitude—here, the amplitude of the signal 145G—out of those several horizontal scans may correspond to the beam being vertically (as well as horizontally) aligned with the marker center, as can be seen from a comparison of the laser spot locations in parts (i) through (iii) in FIG. 13C. It is observed that, if multiple markers—similar to the marker 141 in FIG. 13C—are present on the surface portion 147, they may enable the measurement of the laser beam's vertical angular speed.

Figure 13D:
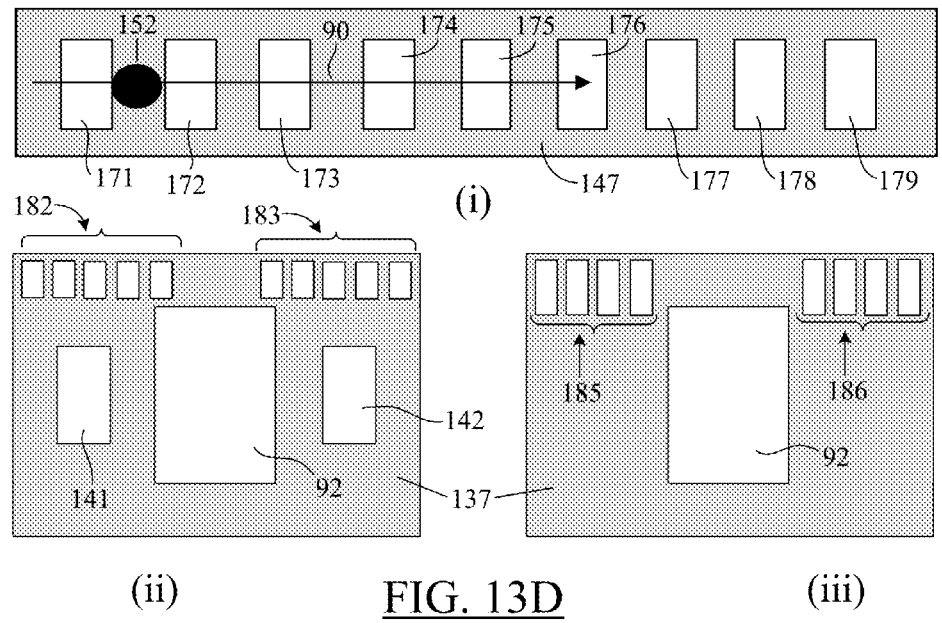

In part (i) of FIG. 13D, a row of markers is shown on the enclosure surface portion 147. The row of markers includes the reflective markers 171-179. The row of markers 171-179 may be placed above or below the projector opening 92 to measure beam horizontal speed as a function of beam's horizontal angle. In particular embodiments, such speed measurement may be carried out across the entire horizontal scan. It is noted here that the markers 171-179 may be mutually substantially horizontally-aligned and may be present along at least one scanning line outside the field of scan. In one embodiment, this set of markers 171-179 may be in addition to the marker 141, and may be placed either above or below the marker 141. Furthermore, in another embodiment, there may be a similar set of markers (not shown) above or below the marker 142 on the opposite side of the opening 92 (and inside the enclosure 137). The photo sensor 139 may be operable to sense light reflected from each marker present inside the enclosure 137 and generate the necessary output signals. Each marker may be illuminated by the light source 33 when the light source is activated to project light spots beyond the field of scan. As before, the photo sensor 139 may be a single photocell placed inside the enclosure 137 at such a location where light can be received from each marker present inside the enclosure 137.

In the embodiments of parts (ii) and (iii) of FIG. 13D, the opening 92 is shown to be "surrounded" on all four sides by the enclosure material. In other words, the opening 92 in parts (ii) and (iii) of FIG. 13D may be considered a "closed" one. On the other hand, in certain embodiments, such as, for example, in the embodiment of FIG. 11, the opening 92 may be surrounded by only two sides 147-148 of the enclosure material. In part (ii) of FIG. 13D, two additional rows of markers 182-183 are shown to be present above the opening 92 to measure beam horizontal speed as a function of beam's horizontal angle—like in the embodiment of part (i) of FIG. 13D. However, unlike part (i) of FIG. 13D, for ease of illustration, each marker in a row is not individually identified in part (ii) of FIG. 13D. Furthermore, the five markers are shown in each row 182-183 for illustrative purpose only. In some embodiments, the total number of markers in a row may be different than those shown in parts (i), (ii), or (iii) of FIG. 13D. The additional rows of markers 182-183 are also shown to be above the corresponding, earlier-discussed markers 141-142. However, as mentioned earlier, these rows of markers 182-183 may be placed below the markers 141-142. Furthermore, in certain embodiments, the centrally-placed markers 141-142 may be completely absent. Instead, only the individual rows of markers may be present, as is the case with rows 185-186 in part (iii) of FIG. 13D. Again, for ease of illustration, each marker is not individually identified, and four markers are shown in each row 185-186 for illustrative purpose only.

The calibration process discussed earlier with reference to FIGS. 12-13 would align the laser spots with the corresponding markers, which, in turn, would translate to a point scan (of a 3D object) without any horizontal or vertical scan errors like those illustrated in FIGS. 7A-7B.

Figure 14:
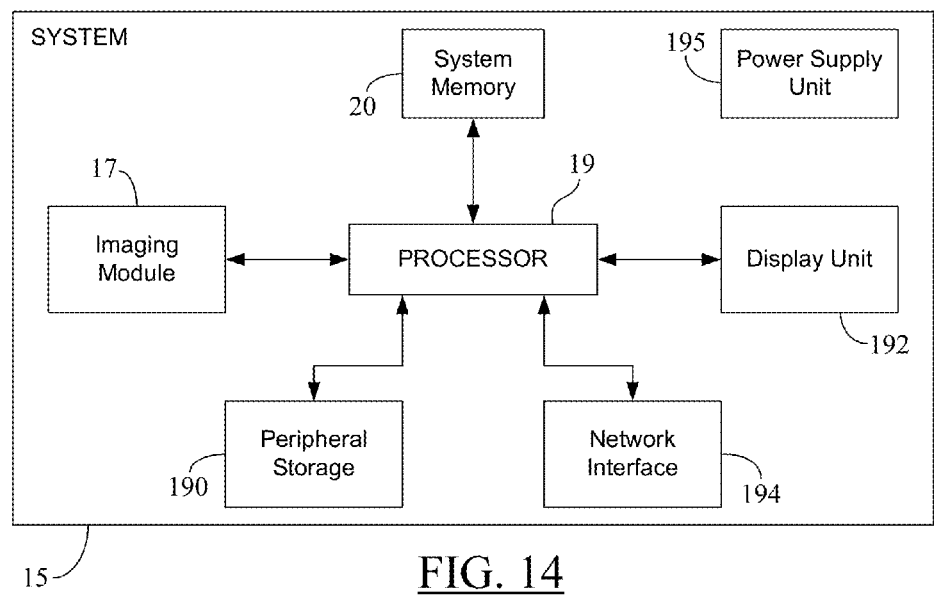
FIG. 14 depicts an overall layout of the system in FIGS. 1-2 according to one embodiment of the present disclosure.

FIG. 14 depicts an overall layout of the system 15 in FIGS. 1-2 according to one embodiment of the present disclosure. Hence, for ease of reference and discussion, the same reference numerals are used in FIGS. 1-2 and 14 for the common system components/units.

As discussed earlier, the imaging module 17 may include the desired hardware shown in the exemplary embodiments of FIGS. 2 and 9-10 to accomplish 2D imaging, 3D depth measurements, and automatic calibration as per the inventive aspects of the present disclosure. The processor 19 may be configured to interface with a number of external devices. In one embodiment, the imaging module 17 may function as an input device that provides data inputs—in the form of pixel data during 2D/3D imaging, signals from the MEMS driver 94, outputs from the photo sensor 139 during self-calibration, and the like—to the processor 19 for further processing. The processor 19 may also receive inputs from other input devices (not shown) that may be part of the system 15. Some examples of such input devices include a computer keyboard, a touchpad, a touch-screen, a joystick, a physical or virtual "clickable button," and/or a computer mouse/pointing device. In FIG. 14, the processor 19 is shown coupled to the system memory 20, a peripheral storage unit 190, one or more output devices 192, and a network interface unit 194. In FIG. 14, a display unit is shown as an example of an output device 192. In some embodiments, the system 15 may include more than one instance of the devices shown. Some examples of the system 15 include a computer system (desktop or laptop), a tablet computer, a mobile device, a cellular phone, a video gaming unit or console, a machine-to-machine (M2M) communication unit, a robot, an automobile, a virtual reality equipment, a stateless "thin" client system, a car's dash-cam or rearview camera system, or any other type of computing or data processing device. In various embodiments, all of the components shown in FIG. 14 may be housed within a single housing. Thus, the system 15 may be configured as a standalone system or in any other suitable form factor. In some embodiments, the system 15 may be configured as a client system rather than a server system.

In particular embodiments, the system 15 may include more than one processor (e.g., in a distributed processing configuration). When the system 15 is a multiprocessor system, there may be more than one instance of the processor 19 or there may be multiple processors coupled to the processor 19 via their respective interfaces (not shown). The processor 19 may be a System on Chip (SoC) and/or may include more than one Central Processing Units (CPUs).

As mentioned earlier, the system memory 20 may be any semiconductor-based storage system such as, for example, DRAM, SRAM, PRAM, RRAM, CBRAM, MRAM, STT-MRAM, and the like. In some embodiments, the memory unit 20 may include at least one 3DS memory module in conjunction with one or more non-3DS memory modules. The non-3DS memory may include Double Data Rate or Double Data Rate 2, 3, or 4 Synchronous Dynamic Random Access Memory (DDR/DDR2/DDR3/DDR4 SDRAM), or Rambus® DRAM, flash memory, various types of Read Only Memory (ROM), etc. Also, in some embodiments, the system memory 20 may include multiple different types of semiconductor memories, as opposed to a single type of memory. In other embodiments, the system memory 20 may be a non-transitory data storage medium The peripheral storage unit 190, in various embodiments, may include support for magnetic, optical, magneto-optical, or solid-state storage media such as hard drives, optical disks (such as Compact Disks (CDs) or Digital Versatile Disks (DVDs)), non-volatile Random Access Memory (RAM) devices, and the like. In some embodiments, the peripheral storage unit 190 may include more complex storage devices/systems such as disk arrays (which may be in a suitable RAID (Redundant Array of Independent Disks) configuration) or Storage Area Networks (SANs), and the peripheral storage unit 190 may be coupled to the processor 19 via a standard peripheral interface such as a Small Computer System Interface (SCSI) interface, a Fibre Channel interface, a Firewire® (IEEE 1394) interface, a Peripheral Component Interface Express (PCI Express™) standard based interface, a Universal Serial Bus (USB) protocol based interface, or another suitable interface. Various such storage devices may be non-transitory data storage media.

The display unit 192 may be an example of an output device. Other examples of an output device include a graphics/display device, a computer screen, an alarm system, a CAD/CAM (Computer Aided Design/Computer Aided Machining) system, a video game station, a smartphone display screen, or any other type of data output device. In some embodiments, the input device(s), such as the imaging module 17, and the output device(s), such as the display unit 192, may be coupled to the processor 19 via an I/O or peripheral interface(s).

In one embodiment, the network interface 194 may communicate with the processor 19 to enable the system 15 to couple to a network (not shown). In another embodiment, the network interface 194 may be absent altogether. The network interface 194 may include any suitable devices, media and/or protocol content for connecting the system 15 to a network—whether wired or wireless. In various embodiments, the network may include Local Area Networks (LANs), Wide Area Networks (WANs), wired or wireless Ethernet, telecommunication networks, or other suitable types of networks.

The system 15 may include an on-board power supply unit 195 to provide electrical power to various system components illustrated in FIG. 14. The power supply unit 195 may receive batteries or may be connectable to an AC electrical power outlet. In one embodiment, the power supply unit 195 may convert solar energy or other renewable energy into electrical power.

In one embodiment, the imaging module 17 may be integrated with a high-speed interface such as, for example, a Universal Serial Bus 2.0 or 3.0 (USB 2.0 or 3.0) interface or above, that plugs into any Personal Computer (PC) or laptop. A non-transitory, computer-readable data storage medium, such as, for example, the system memory 20 or a peripheral data storage unit such as a CD/DVD may store program code or software. The processor 19 and/or the processing circuits 46 (FIG. 2) in the imaging module 17 may be configured to execute the program code, whereby the device 15 may be operative to perform the 2D imaging and 3D depth measurements (and related self-calibration) as discussed hereinbefore—such as, for example, the operations discussed earlier with reference to FIGS. 1-13. For example, in certain embodiments, upon execution of the program code, the processor 19 and/or the processing circuits 46 may suitably configure (or activate) relevant circuit components—such as the MEMS scanner 87, laser light source 33, MEMS driver 94, laser driver 100, and the like—to appropriately carry out self-calibration as per teachings of the present disclosure with the help of those components and to thereby increase the accuracy of 3D depth sensing performed by the system 15. The program code or software may be proprietary software or open source software which, upon execution by the appropriate processing entity—such as the processor 19 and/or the processing unit 46—may enable the processing entity to project laser spots on one or more reflective markers, capture light reflected from the marker(s) using a photo sensor, process the output signals generated by the photo sensor, and, based on the processing of the photo sensor output signals, adjust the placement of light spots to be projected on the marker(s) in the future. In this manner, automatic calibration for 3D depth sensing may be performed without interfering with routine 3D imaging operation.

In the preceding description, for purposes of explanation and not limitation, specific details are set forth (such as particular architectures, waveforms, interfaces, techniques, etc.) in order to provide a thorough understanding of the disclosed technology. However, it will be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, such as, for example, any elements developed that perform the same function, regardless of structure.

Thus, for example, it will be appreciated by those skilled in the art that block diagrams herein (e.g., in FIGS. 1-2) can represent conceptual views of illustrative circuitry or other functional units embodying the principles of the technology. Similarly, it will be appreciated that the flowchart in FIG. 8 represents various processes which may be substantially performed by a processor (e.g., the processor 19 in FIG. 14 and/or the processing unit 46 in FIG. 2). Such a processor may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above in the context of FIGS. 1-13 also may be provided by such a processor, in the hardware and/or software.

When certain inventive aspects require software-based processing, such software or program code may reside in a computer-readable data storage medium. As noted earlier, such data storage medium may be part of the peripheral storage 190, or may be part of the system memory 20 or any internal memory (not shown) of the image sensor unit 24, or the processor's 19 internal memory (not shown). In one embodiment, the processor 19 or the processing unit 46 may execute instructions stored on such a medium to carry out the software-based processing. The computer-readable data storage medium may be a non-transitory data storage medium containing a computer program, software, firmware, or microcode for execution by a general purpose computer or a processor mentioned above. Examples of computer-readable storage media include a ROM, a RAM, a digital register, a cache memory, semiconductor memory devices, magnetic media such as internal hard disks, magnetic tapes and removable disks, magneto-optical media, and optical media such as CD-ROM disks and DVDs.

Alternative embodiments of the imaging module 17 or the system 15 comprising such an imaging module according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features. As mentioned before, various 2D and 3D imaging functions discussed herein may be provided through the use of hardware (such as circuit hardware) and/or hardware capable of executing software/firmware in the form of coded instructions or microcode stored on a computer-readable data storage medium (mentioned above). Thus, such functions and illustrated functional blocks are to be understood as being either hardware-implemented and/or computer-implemented, and thus machine-implemented.

The foregoing describes a system and method in which self-calibration is accomplished in a 3D camera using one or more patterned markings inside the projector module of the camera. The 3D camera may include a sensor module (or an image sensor unit) and a projector module, and may be part of a mobile device such as, for example, a smartphone. The 3D camera may perform routine 2D (color) imaging as well as 3D depth measurements. In 3D imaging, a laser light laser source may be used as a scanning beam projector to point scan the surface of a 3D object with light spots, which may be then detected by a pixel array in the image sensor unit of the 3D camera to generate the 3D depth profile of the object using triangulation. A row of pixels in the pixel array forms an epipolar line of a laser scanning line. The sensed depth depends on the alignment of the sensor module and the projector module, and also on the projector's laser turn-on delay. To maintain accurate depth sensing, self-calibration of camera's depth sensing operation is periodically performed. Self-calibration is made possible by augmenting the projector module with a light-sensing element and one or more reflective markings/markers inside the projector module. To calibrate the camera, the markings are point-scanned using the laser beam and the reflected light is sensed using the newly-added light-sensing element. The output of the light-sensing element is sent to the sensor module for analysis. Based on such analysis, the laser's turn-on delay is adjusted to perfectly align a laser light spot—in horizontal and vertical directions—with the corresponding reflective marker. By using special arrangements of reflective markers, the exact direction and speed of the scanning beam over time can be determined as well. The marker-based automatic calibration can periodically run in the background without interfering with the normal camera operation.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. An imaging unit, comprising:
   a projector module having an enclosure that includes:
      a light source operable to perform a one-dimensional (1D) point scan of a three-dimensional (3D) object along a plurality of scanning lines, wherein the point scan projects a sequence of light spots on a surface of the 3D object through an opening in the enclosure, wherein the opening defines boundaries of a field of scan on the surface of the 3D object in which the light spots are projected along the plurality of scanning lines, and wherein the opening is such that each of the plurality of scanning lines extends inside the enclosure beyond the field of scan;
      at least one first reflective marker on a first side of the opening inside the enclosure, wherein each first reflective marker is present along at least one scanning line and outside of the field of scan;
      a photo sensor operable to sense light reflected from each first reflective marker that is illuminated by the light source when the light source is activated to project light spots beyond the field of scan, the photo sensor operable to generate an output signal upon sensing the light reflected from a corresponding first reflective marker that is illuminated by the light source; and
      an image sensor unit operatively coupled to the projector module to send an enable signal to the projector module to activate the light source to project one or more light spots on the corresponding first reflective marker, receive the output signal from the photo sensor, analyze the output signal received from the photo sensor, determine an Area-Under-the-Curve (AUC) of the output signal, and adjust a timing delay of the enable signal to maximize the AUC of the output signal to control future activation of the light source to improve physical placement of a subsequent light spot on the corresponding first reflective marker when the subsequent light spot is projected by the light source upon future activation.

2. The imaging unit of claim 1, wherein the light source is operable to perform the point scan in a raster scan pattern.

3. The imaging unit of claim 1, wherein each first reflective marker is aligned with the opening.

4. The imaging unit of claim 1, wherein at least one first reflective marker includes two or more first reflective markers on the first side of the opening inside the enclosure, and wherein each of the two or more first reflective markers is present along at least one scanning line outside of the field of scan.

5. The imaging unit of claim 1, wherein the enclosure further includes:
   at least one second reflective marker either above or below a corresponding first reflective marker on the first side of the opening inside the enclosure, wherein each second reflective marker is present along at least one scanning line and outside of the field of scan, and wherein the photo sensor is operable to sense light reflected from each second reflective marker that is illuminated by the light source when the light source is activated to project light spots beyond the field of scan.

6. The imaging unit of claim 1, wherein the enclosure further includes at least one of the following:
at least one second reflective marker on a second side of the opening inside the enclosure, wherein the second side is opposite of the first side, and wherein each second reflective marker is present along at least one scanning line and outside of the field of scan; and
at least one third reflective marker either above or below a corresponding second reflective marker on the second side of the opening inside the enclosure, wherein each third reflective marker is present along at least one scanning line and outside of the field of scan,
and wherein the photo sensor is operable to sense light reflected from each second and third reflective markers that are illuminated by the light source when the light source is activated to project light spots beyond the field of scan.

7. The imaging unit of claim 1, wherein the image sensor unit is operative to further perform the following:
repeatedly send a sequence of enable signals to the projector module and receive corresponding output signals from the photo sensor;
continue to analyze each received output signal and to thereby adjust a timing delay of each newly-transmitted enable signal in the sequence of enable signals; and
conclude repeated transmission of multiple enable signals when a most-recent light spot projected by the light source is aligned with the corresponding first reflective marker.

8. The imaging unit of claim 1, wherein the image sensor unit includes:
a plurality of pixels arranged in a two-dimensional (2D) pixel array forming an image lane, wherein a row of pixels in the 2D pixel array forms an epipolar line of one of the plurality of scanning lines, and wherein each pixel in the row of pixels is operative to detect a corresponding light spot in a portion of the sequence of light spots projected by the light source along the one of the plurality of scanning lines.

9. The imaging unit of claim 1, wherein the light source is one of the following:
a laser operating in conjunction with a resonating-type Micro Electro-Mechanical Systems (MEMS) scanner;
a laser operating in conjunction with an electro-static MEMS scanner; and
an X-Y addressable light source.

10. A method, comprising:
performing a one-dimensional (1D) point scan of a three-dimensional (3D) object along a first scanning line, wherein the point scan projects a sequence of light spots on a surface of the 3D object through an opening in an enclosure, wherein the opening defines boundaries of a field of scan on the surface of the 3D object in which the light spots are projected along the first scanning line, and wherein the opening is such that the first scanning line extends inside the enclosure beyond the field of scan;
projecting one or more light spots on a first reflective marker that is present adjacent to the opening inside the enclosure along the first scanning line and outside of the field of scan;
sensing light reflected from the first reflective marker;
generating an output signal based on the sensed light;
based on the sensed light, determine an Area-Under-the-Curve (AUC) of the output signal; and
adjusting placement of the one or more light spots to be projected on the first reflective marker in a future point scan to maximize the AUC of the output signal.

11. The method of claim 10, wherein projecting the one or more light spots includes:
triggering a light source inside the enclosure to project the one or more light spots on the first reflective marker, wherein sensing the light includes:
using a photo sensor inside the enclosure to sense the light reflected from the first reflective marker and to generate an output signal upon sensing the reflected light, and
wherein adjusting the placement includes:
analyzing the output signal; and
based on the analysis of the output signal, modifying a timing of the triggering of the light source during the future point scan so as to adjust the placement of the one or more light spots to be projected on the first reflective marker.

12. The method of claim 11, wherein analyzing the output signal includes:
comparing rise and fall times of the output signal to determine a symmetry of the output signal around a midpoint, and
wherein the method further includes:
ceasing modification of the timing of the triggering of the light source upon determining the symmetry of the output signal around the midpoint.

13. The method of claim 10, further comprising:
performing the point scan along a second scanning line within the field of scan by projecting additional light spots along the second scanning line through the opening, wherein the second scanning line extends inside the enclosure beyond the field of scan;
continuing to project the additional light spots on a sequence of second reflective markers present along the second scanning line inside the enclosure, wherein the sequence of second reflective markers is adjacent to the opening near the first reflective marker and outside of the field of scan;
sensing light reflected from each second reflective marker to generate a second reflective marker-specific output signal; and
analyzing all second reflective marker-specific output signals to determine at least one of the following:
horizontal angular speed of the point scan,
vertical angular speed of the point scan, and
extent of vertical alignment of light spots with respective second reflective markers.

14. A system, comprising:
a projector module having an enclosure that includes:
a light source operable to perform a one-dimensional (1D) point scan of a three-dimensional (3D) object along a plurality of scanning lines, wherein the point scan projects a sequence of light spots on a surface of the 3D object through an opening in the enclosure, wherein the opening defines boundaries of a field of scan on the surface of the 3D object in which the light spots are projected along the plurality of scanning lines, and wherein the opening is such that each of the plurality of scanning lines extends inside the enclosure beyond the field of scan,
a reflective marking adjacent to the opening inside the enclosure, wherein the reflective marking is present along at least one scanning line and outside of the field of scan, a photo sensor operable to generate an output signal upon sensing light reflected from the reflective marking that is illuminated by the light source when the light source is activated to project light spots beyond the field of scan;

a memory for storing program instructions; and a processor coupled to the memory and to the projector module, wherein the processor is configured to execute the program instructions, whereby the processor is operative to perform the following:

send an enable signal to the projector module to activate the light source to project one or more light spots on the reflective marking, receive the output signal from the photo sensor, perform an analysis of the output signal, determine an Area-Under-the-Curve (AUC) of the output signal, and adjust a timing delay of the enable signal to control future activation of the light source to enable the light source to project a light spot on the reflective marking to maximize the AUC of the output signal placement of the one or more light spots to be projected on the reflective marking in a future point scan.

15. The system of claim 14, wherein the system is one of the following:

a mobile device;
a smartphone;
a tablet computer;
a computing unit;
a User Equipment (UE);
an automobile;
a virtual reality equipment; and
a robot.

* * * * *